(12) United States Patent
Lee

(10) Patent No.: US 7,876,304 B2
(45) Date of Patent: Jan. 25, 2011

(54) THIN FILM PANEL, DRIVING DEVICE, AND LIQUID CRYSTAL DISPLAY HAVING THE SAME

(75) Inventor: Ki-Chan Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 885 days.

(21) Appl. No.: 11/369,119

(22) Filed: Mar. 6, 2006

(65) Prior Publication Data

US 2006/0202947 A1 Sep. 14, 2006

(30) Foreign Application Priority Data

Mar. 8, 2005 (KR) .................. 10-2005-0019133

(51) Int. Cl.
*G09G 3/36* (2006.01)
(52) U.S. Cl. .................... 345/102; 345/87; 345/207
(58) Field of Classification Search .......... 345/87, 345/207, 102, 204, 690; 250/214 A–214 C
See application file for complete search history.

(56) References Cited

U.S. PATENT DOCUMENTS

| | | | | |
|---|---|---|---|---|
| 4,690,508 | A * | 9/1987 | Jacob | 349/195 |
| 4,716,403 | A * | 12/1987 | Morozumi | 345/88 |
| 4,803,375 | A * | 2/1989 | Saito et al. | 250/208.1 |
| 5,831,693 | A | 11/1998 | McCartney, Jr. et al. | |
| 6,545,658 | B2 * | 4/2003 | Ohta et al. | 345/98 |
| 6,710,318 | B2 | 3/2004 | Lin | 250/205 |
| 6,995,753 | B2 * | 2/2006 | Yamazaki et al. | 345/204 |
| 7,026,597 | B2 * | 4/2006 | Cok | 250/214 AL |
| 2002/0030768 | A1 | 3/2002 | Wu | |
| 2003/0137485 | A1 * | 7/2003 | Wei et al. | 345/102 |
| 2003/0231161 | A1 * | 12/2003 | Yamaguchi | 345/102 |
| 2004/0022954 | A1 | 2/2004 | Tsuda et al. | 427/402 |
| 2004/0201786 | A1 | 10/2004 | Park et al. | |
| 2005/0218351 | A1 * | 10/2005 | Sheng et al. | 250/573 |

FOREIGN PATENT DOCUMENTS

| | | |
|---|---|---|
| EP | 0296725 A2 | 12/1988 |
| EP | 1251482 A2 | 10/2002 |
| JP | 2000-122575 | 4/2000 |
| JP | 2000-131137 | 5/2000 |
| JP | 2001-134235 | 5/2001 |
| JP | 2002-174806 | 6/2002 |
| JP | 2003-30938 | 10/2003 |
| KR | 10-2004-0012870 | 2/2004 |
| KR | 10-2004-0076900 | 9/2004 |
| KR | 10-2004-0086973 | 10/2004 |
| KR | 10-2004-0096186 | 11/2004 |
| KR | 10-2004-0106635 | 12/2004 |
| WO | 2004090708 A1 | 10/2004 |

* cited by examiner

*Primary Examiner*—Amare Mengistu
*Assistant Examiner*—Hong Zhou
(74) *Attorney, Agent, or Firm*—Cantor Colburn LLP

(57) ABSTRACT

A thin film panel, a driving device, and a liquid crystal display having the thin film panel and the driving device are provided. The thin film panel includes a first panel, a second panel, and an illumination sensor, wherein the illumination sensor includes a plurality of color filters formed on the first panel and a plurality of photo sensors formed on the second panel opposed to the plurality of color filters.

29 Claims, 13 Drawing Sheets

700

| Filter<br>Light source | Red filter | Green filter | White filter |
|---|---|---|---|
| Candescent light | High | Middle | High |
| Flnorescent light | Low | High | High |
| Day light | High | High | High |

THIN FILM PANEL, DRIVING DEVICE, AND LIQUID CRYSTAL DISPLAY HAVING THE SAME

This application claims priority to Korean Patent Application No. 10-2005-0019133, filed on Mar. 8, 2005 and all the benefits accruing therefrom under 35 U.S.C. §119, and the contents of which in its entirety are herein incorporated by reference.

BACKGROUND OF THE INVENTION (a) Field of the Invention

The present invention relates to a thin film panel, a driving device, and a liquid crystal display having the same. More particularly, the present invention relates to a thin film panel and a driving device fitted with an illumination sensor having a spectrum property that is close to human visibility, and a liquid crystal display having the same.

(b) Description of the Related Art

Generally, a liquid crystal display ("LCD") includes a lower panel having pixel electrodes and an upper panel having a common electrode, and a liquid crystal layer having dielectric anisotropy therebetween. The lower panel includes a plurality of gate lines and data lines forming pixel areas. The pixel electrodes are arranged in a matrix shape within the pixel areas, are connected to switching elements such as thin film transistors ("TFTs"), and are supplied with data voltages line by line. The common electrode is formed on the entire surface of the upper panel and is supplied with a common voltage. The liquid crystal layer between the pixel electrodes and the common electrode constitutes a liquid crystal capacitor from the viewpoint of circuitry, and the liquid crystal capacitor forms a basic unit of a pixel along with a switching element, such as a TFT, connected to the liquid crystal capacitor.

In such an LCD, a desired image can be obtained by applying voltages to the pixel and common electrodes to generate an electric field in the liquid crystal layer and by adjusting the intensity of the electric field to control the transmittivity of light passing through the liquid crystal layer.

The light may be emitted from an artificial light source specifically provided or it may be natural light.

The light source unit for the LCD, that is, a backlight unit, employs a plurality of fluorescent lamps such as a cold cathode fluorescent lamp ("CCFL") or an external electrode fluorescent lamp ("EEFL") as a light source, and includes inverters for driving the lamps. The inverter turns on a lamp by converting an input DC voltage into an AC voltage in response to a brightness control voltage inputted from an external device and applying the AC voltage to the lamp. The inverter also adjusts the brightness of the lamp, detects current flowing in the lamp, and controls the voltage applied to the lamp on the basis of the detected current.

Such an LCD can be classified into a transmissive LCD, a reflective LCD, and a transflective LCD. The transmissive LCD displays an image by the use of a lighting unit disposed on the rear surface of a liquid crystal panel assembly. The reflective LCD displays an image by the use of external natural light. The transflective LCD has a structure in which the transmissive LCD and the reflective LCD are combined structurally. The transflective LCD operates in a transmission mode in which an image is displayed by the use of an internal light source indoors or in a dark place where no external light source exists, and operates in a reflection mode in which an image is displayed by reflecting external light outdoors or in a bright place, depending upon the types of light source.

As for an LCD such as an LCD television, technologies for realizing optimal image quality by varying screen brightness in response to ambient illumination have been developed. For example, company S advertises that by providing an external illumination sensor to the outside of an LCD and adjusting a backlight depending upon an indoor light status, the LCD televisions made by the company S should maintain the optimal brightness and image quality even when the indoor lighting status varies or the LCD televisions are placed by a window through which a lot of external natural light enters.

In a bright indoor place, that is, in an indoor place with high illumination, such an LCD television maximizes the brightness of the backlight and provides a vivid screen, while in a dark indoor place, that is, in an indoor place with low illumination, the LCD television provides too bright a screen such that human eyes become tired and a phenomenon that dark colors become bright colors to reduce a contrast ratio occurs. This is because the light intensity of the backlight is too great which causes the leakage of light to increase.

The conventional external-fitting illumination sensor used for solving such a problem detects only incident light energy regardless of spectrums of light sources. That is, the conventional external-fitting illumination sensor does not distinguish the kinds or types of light sources from each other, though the light source may be natural light such as daylight and may be fluorescent light or candescent light.

In order to solve such a problem, a sensor characteristic to be closer to the human visibility by changing the structure of the illumination sensor or inserting an optical filter thereto is needed, however, there is a problem in that change of elements and addition of processes for purchasing and fitting such a sensor increase cost.

BRIEF SUMMARY OF THE INVENTION

The present invention provides a thin film panel, a driving device, and an LCD having the thin film panel and the driving device, which is fitted with an illumination sensor having a spectrum property that is close to human visibility without increasing cost.

According to exemplary embodiments of the present invention, there is provided a thin film panel having a first panel, a second panel, and an illumination sensor, wherein the illumination sensor includes a plurality of color filters formed on the first panel and a plurality of photo sensors formed on the second panel opposed to the plurality of color filters.

In this case, the plurality of color filters may include at least two of a red filter, a green filter, a blue filter, and a white filter, and the plurality of color filters may include a red filter, a green filter, and a white filter or may include a red filter, a green filter, and a blue filter.

Further, the photo sensors may vary in resistance, depending upon light energy passing through the color filters.

Each photo sensor may include a substrate, a first insulating layer formed on the substrate, a semiconductor layer formed on the first insulating layer, first and second electrodes formed on the semiconductor layer, and a second insulating layer formed on the first and second electrodes.

The second panel may be a thin film transistor panel including a plurality of gate lines and data lines, and the first and second electrodes of each photo sensor may be formed within a same layer of the second panel as the data lines.

In this case, it is preferable that the first and second electrodes alternate with each other in a comb tooth shape. The semiconductor layer may include amorphous silicon.

The illumination sensor may be formed on an edge of the thin film panel.

The first panel may be a common electrode panel including a common electrode and the second panel may be a thin film transistor panel including a plurality of thin film transistors and pixel electrodes.

Each photo sensor may generate an output voltage proportional to energy of ambient light incident to the illumination sensor. The output voltage may correspond to intensity and type of ambient light.

According to other exemplary embodiments of the present invention, there is provided a driving device of a liquid crystal display having a thin film panel with a plurality of pixels formed thereon. The driving device includes an illumination sensor outputting a plurality of sensing signals based on external light, a determination unit comparing the sensing signals with each other and outputting a plurality of first control signals based on a result of comparing the sensing signals with each other, and a signal controller outputting a plurality of second control signals based on the first control signals from the determination unit.

In this case, the illumination sensor may be integrated in the thin film panel and may include first and second resistors connected in series between an input voltage and a ground voltage.

Here, the first resistor may be a variable resistor of which resistance varies depending upon the external light, and the second resistor may be a constant resistor with constant resistance.

The driving device may further include an output terminal connected to a node between the variable resistor and the constant resistor. The sensing signals may be output from the output terminal.

The sensing signals may be proportional to energy of the external light.

The pixels may include pixels of three colors, and the driving device may further include a gray voltage generator generating a plurality of gray scale voltages in a unit of three colors, and a backlight unit supplying internal light to the thin film panel.

The second control signals may include a third control signal supplied to the gray voltage generator and a fourth control signal supplied to the backlight unit.

In this case, the third control signal may be generated based on a type of a light source emitting the external light and the fourth control signal may be generated based on brightness of the external light.

The determination unit may include a lookup table in which magnitudes of the sensing signals are classified based on the type of light source emitting the external light.

The thin film panel may include first and second panels, and the illumination sensor may output the sensing signals corresponding to energy of light passing through a color filter formed on the first panel.

The first panel may be a common electrode panel and the second panel may be a thin film substrate panel, wherein the illumination sensor includes photo sensors formed on the second panel.

The color filter may be any one of a red filter, a green filter, a blue filter, and a white filter.

Also, the illumination sensor may include first to third sensors, and the first to third sensors may include the red filter, the green filter, and the white filter, respectively.

The determination unit may output the first control signal for controlling the backlight unit based on the sensing signal output from the second sensor.

The liquid crystal display may be any one of a transmissive type, a reflective type, and a transflective type.

According to other exemplary embodiments of the present invention, there is provided a liquid crystal display including a thin film panel having first and second panel and an illumination sensor integrated on the thin film panel, wherein the illumination sensor includes a plurality of color filters formed on the first panel, and a plurality of photo sensors formed on the second panel and opposed to the plurality of color filters.

The plurality of color filters may include at least two of a red filter, a green filter, a blue filter, and a white filter. The plurality of color filters may include a red filter, a green filter, and a white filter, or may include a red filter, a green filter, and a blue filter.

Here, the photo sensors may vary in resistance depending upon light energy passing through the color filters.

Each photo sensor may include a substrate, a first insulating layer formed on the substrate, a semiconductor layer formed on the first insulating layer, first and second electrodes formed on the semiconductor layer, and a second insulating layer formed on the first and second electrodes.

The first and second electrodes may alternate with each other in a comb tooth shape, and the semiconductor layer may include amorphous silicon.

The illumination sensor may be formed on an edge of the thin film panel.

The illumination sensor may output a plurality of sensing signals based on external light and the liquid crystal display may further include a determination unit comparing the sensing signals with each other and outputting a plurality of first control signals based on a result of comparing the sensing signals with each other, and a signal controller which outputting a plurality of second control signals based on the first control signals from the determination unit. Here, the illumination sensor may include first and second resistors connected in series between an input voltage and a ground voltage.

The first resistor may be a variable resistor of which resistance varies depending upon the external light, and the second resistor may be a constant resistor with constant resistance.

The liquid crystal display may further include an output terminal connected to a node between the variable resistor and the constant resistor, the output terminal outputting the sensing signals. Here, the sensing signals may be proportional to energy of the external light.

The pixels of the liquid crystal display may include pixels of three primary colors, and the liquid crystal display may further include a gray voltage generator generating a plurality of gray scale voltages in a unit of three colors, and a backlight unit supplying internal light to the thin film panel.

The second control signals may include a third control signal supplied to the gray voltage generator and a fourth control signal supplied to the backlight unit.

The third control signal may be generated based on a type of light source emitting the external light, and the fourth control signal may be generated based on brightness of the external light.

The determination unit may include a lookup table in which magnitudes of the sensing signals are classified based on the type of light source emitting the external light. Here, the illumination sensor may output the sensing signals corresponding to energy of light passing through a color filter formed on the first panel.

The color filter may be any one of a red filter, a green filter, a blue filter, and a white filter.

The illumination sensor may include first to third sensors, and the first to third sensors may include the red filter, the green filter, and the white filter, respectively.

The determination unit may output the first control signal for controlling the backlight unit based on the sensing signal output from the second sensor.

The liquid crystal display may be any one of a transmissive type, a reflective type, and a transflective type.

According to other exemplary embodiments of the present invention, there is provided a liquid crystal display including a liquid crystal panel assembly, an illumination sensor disposed on the liquid crystal panel assembly and sensing external light, a gray voltage generator generating a plurality of gray voltages, and a signal controller outputting a signal to the gray voltage generator based on a type of light source emitting the eternal light, wherein the gray voltages are controlled based on the type of light source emitting the external light.

The liquid crystal display may further include a data driver supplying data voltages to data lines of the liquid crystal panel assembly, wherein the gray voltages are provided to the data driver.

The liquid crystal display may further include a backlight unit supplying internal light, wherein the signal controller further outputs a signal to the backlight unit based on brightness of the external light, wherein luminance of the backlight unit is controlled based on brightness of the external light.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE INVENTION

Figure 1:
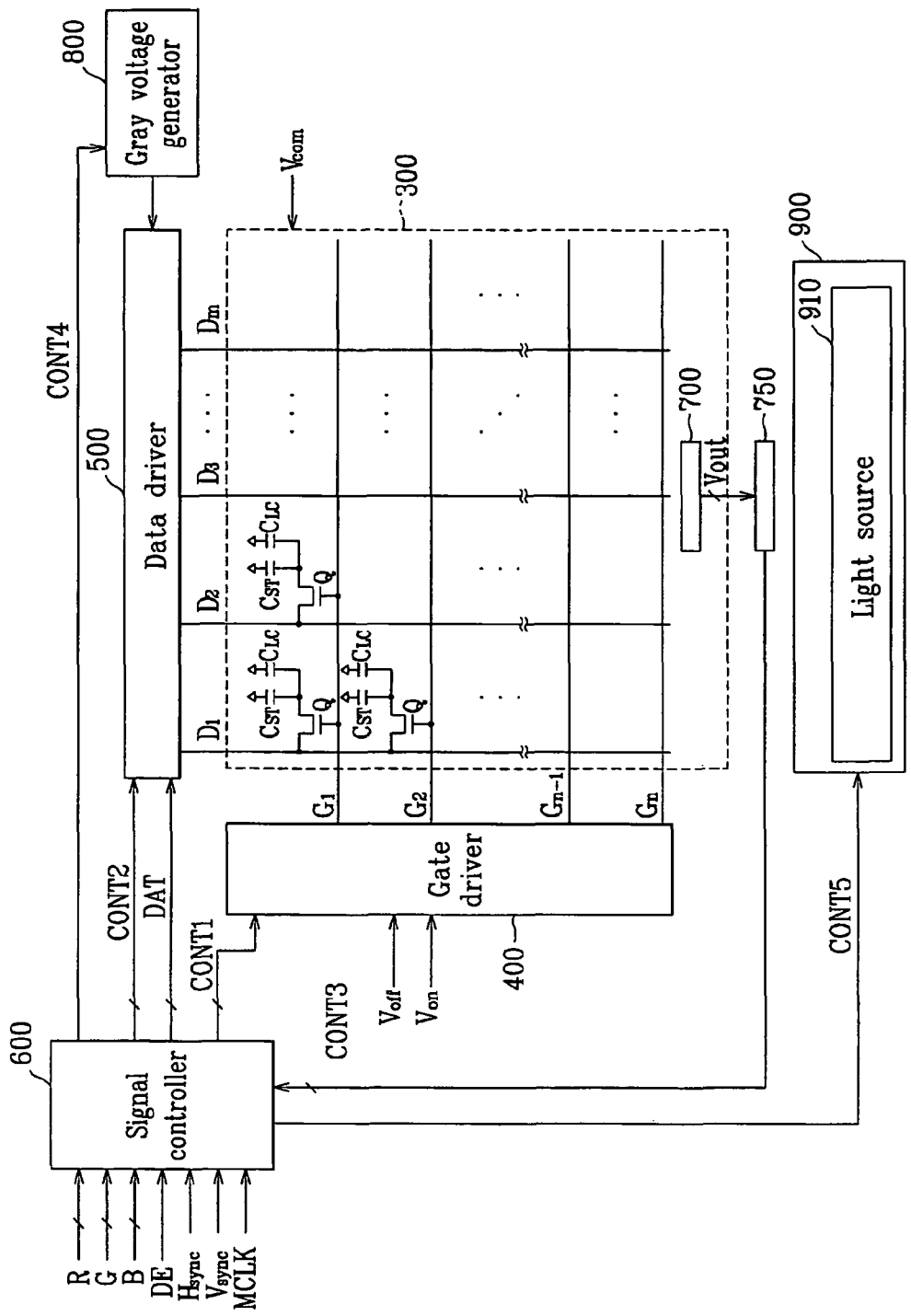
FIG. 1 is a block diagram illustrating an exemplary embodiment of an LCD according to the present invention.

Hereinafter, exemplary embodiments of the present invention will be described in detail with reference to the attached drawings such that the present invention can be easily put into practice by those skilled in the art. In the drawings, thicknesses are enlarged for the purpose of clearly illustrating layers and areas.

The exemplary embodiments of LCDs according to the present invention will now be further described with reference to the accompanying drawings.

Figure 2:
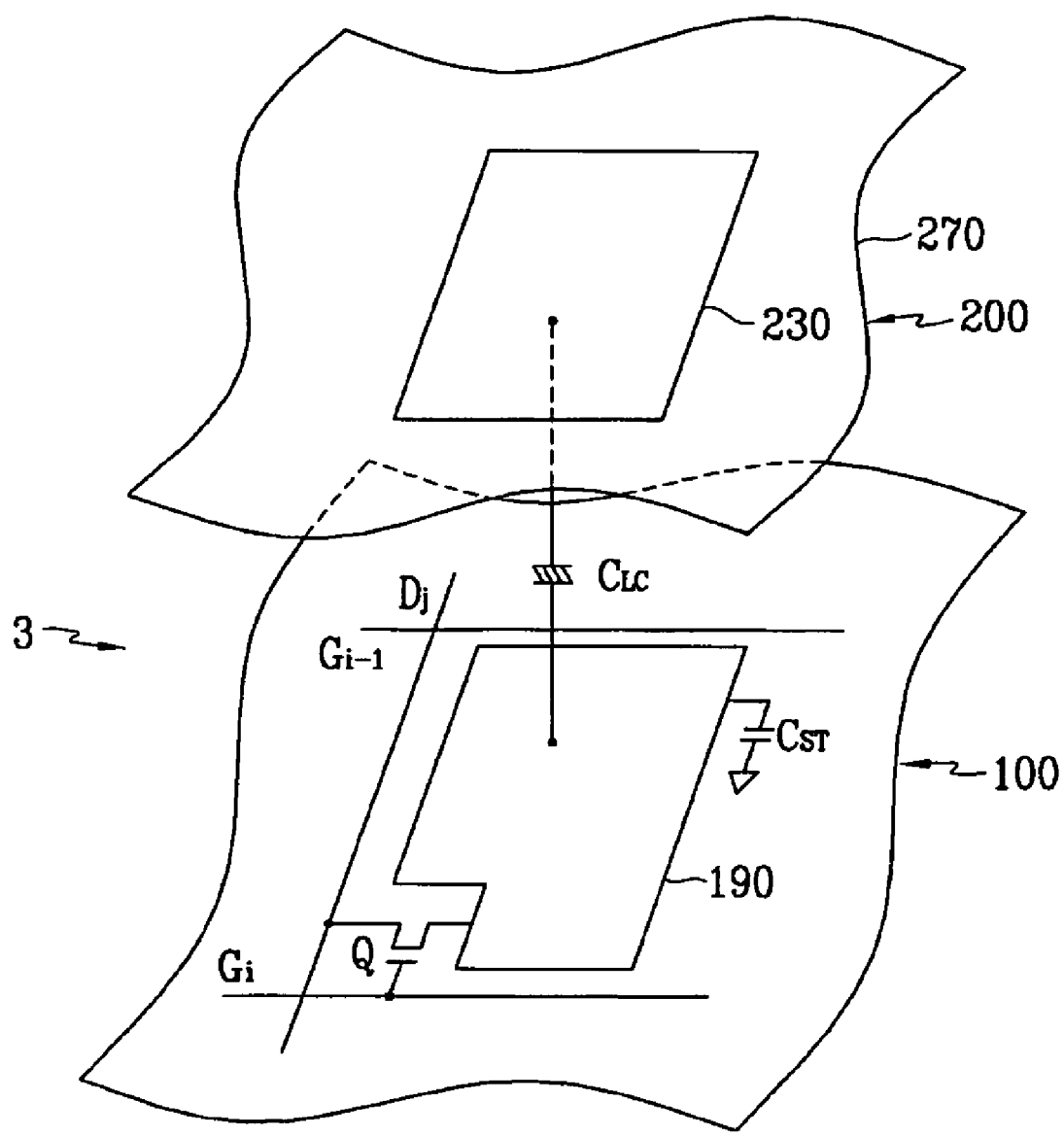
FIG. 2 is an equivalent circuit diagram of an exemplary pixel of the exemplary embodiment of the LCD according to the present invention.
Figure 3:
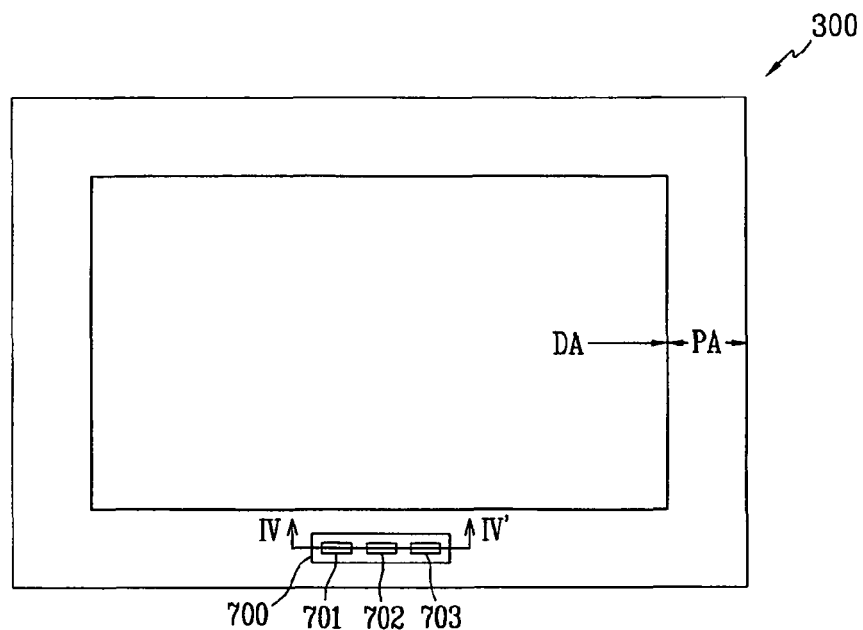
FIG. 3 is a diagram schematically illustrating the exemplary embodiment of the LCD according to the present invention.
Figure 4:
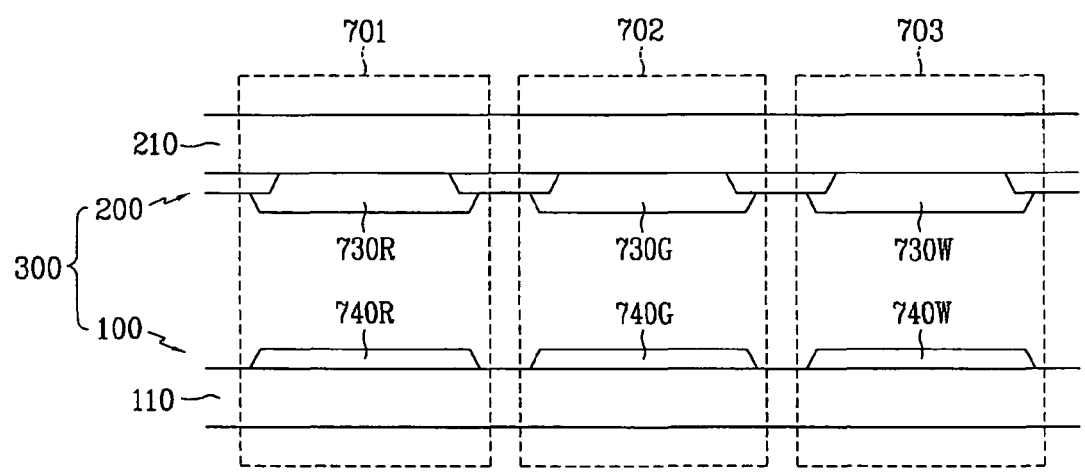
FIG. 4 is a cross-sectional view taken along line IV-IV' of the exemplary embodiments of the LCD shown in FIG. 3.

FIG. 1 is a block diagram illustrating an exemplary embodiment of an LCD according to the present invention and FIG. 2 is an equivalent circuit diagram of an exemplary pixel of the exemplary embodiment of the LCD according to the present invention. FIG. 3 is a diagram schematically illustrating the exemplary embodiment of the LCD according to the present invention and FIG. 4 is a cross-sectional view taken along line IV-IV' of the exemplary embodiment of the LCD shown in FIG. 3.

As shown in FIG. 1, the LCD includes a liquid crystal panel assembly 300, a gate driver 400 and a data driver 500 connected to the liquid crystal panel assembly 300, a gray voltage generator 800 connected to the data driver 500, a backlight unit 900 irradiating light to the liquid crystal panel assembly 300, and a signal controller 600 controlling all the above-mentioned elements.

The liquid crystal panel assembly 300 includes a plurality of display signal lines $G_1$ to $G_n$ and $D_1$ to $D_m$, and a plurality of pixels connected to the plurality of display signal lines $G_1$ to $G_n$ and $D_1$ to $D_m$. The pixels are arranged approximately in a matrix, as seen in the equivalent circuit diagram.

The display signal lines $G_1$ to $G_n$ and $D_1$ to $D_m$ include a plurality of gate lines $G_1$ to $G_n$ for transmitting gate signals (also referred to as "scan signals") and a plurality of data lines $D_1$ to $D_m$ for transmitting data signals. The gate lines $G_1$ to $G_n$ extend approximately in the row direction (e.g., transversely) and are almost parallel to each other. The data lines $D_1$ to $D_m$ extend approximately in the column direction (e.g., longitudinally) and are almost parallel to each other. Thus, the data lines $D_1$ to $D_m$ extend substantially perpendicularly with respect to the gate lines $G_1$ to $G_n$, and are insulated from each other by an insulating layer such as a gate insulating layer, as will be further described below.

Each pixel includes a switching element Q connected to the corresponding display signal lines $G_1$ to $G_n$ and $D_1$ to $D_m$, and a liquid crystal capacitor $C_{LC}$ and a storage capacitor $C_{ST}$ that are connected to the switching element Q. In an alternative embodiment, the storage capacitor $C_{ST}$ may be omitted as appropriate.

The switching element Q such as a thin film transistor ("TFT") is a three-terminal element provided on a lower panel 100, wherein the control terminal (i.e. gate) and the input terminal (i.e. source) are connected to the corresponding gate lines $G_1$ to $G_n$ and the corresponding data lines $D_1$ to $D_m$, respectively, and the output terminal (i.e. drain) is connected to the liquid crystal capacitor $C_{LC}$ and the storage capacitor $C_{ST}$.

The liquid crystal capacitor $C_{LC}$ includes each pixel electrode 190 of the lower panel 100 and a common electrode 270 of an upper panel 200 as two electrodes, and the liquid crystal layer 3 between the two electrodes 190 and 270 as a dielectric. The pixel electrode 190 is connected to the output terminal of the switching element Q, and the common electrode 270 is formed on the entire surface, or substantially the entire surface, of the upper panel 200 and is supplied with a common voltage $V_{com}$. Alternatively, both the pixel electrode 190 and the common electrode 270, which have shapes of bars or stripes, may be provided on the lower panel 100.

The storage capacitor $C_{ST}$ is an auxiliary capacitor for the LC capacitor $C_{LC}$. The storage capacitor $C_{ST}$ includes the pixel electrode 190 and a separate signal line (not shown), which is provided on the lower panel 100, overlaps the pixel electrode 190 via an insulator, and is supplied with a predetermined voltage such as the common voltage Vcom. Alternatively, the storage capacitor $C_{ST}$ includes the pixel electrode 190 and an adjacent gate line called a previous gate line, which overlaps the pixel electrode 190 via an insulator.

For color display, each pixel uniquely represents one of three primary colors such as red, green, and blue colors (spatial division), or sequentially represents the three primary colors in time (temporal division), thereby obtaining a desired color. FIG. 2 shows an example of the spatial division in which each pixel includes a color filter 230 representing one of the three primary colors in an area of the upper panel 200 facing the pixel electrode 190. Alternatively, the color filter 230 is provided on or under the pixel electrode 190 on the lower panel 100.

The backlight unit 900 includes an inverter (not shown) and a light source 910. The light source 910 is provided under the liquid crystal panel assembly 300 and includes at least one lamp. Examples of the lamp can include a cold cathode fluorescent lamp ("CCFL"), an external electrode fluorescent lamp ("EEFL"), and a light emitting diode ("LED").

One or more polarizers (not shown) for polarizing light emitted from the light source 910 are attached to at least one of the lower and upper panels 100 and 200. For example, a first polarized film and a second polarized film may be disposed on the lower panel 100 and the upper panel 200, respectively. The first and second polarized films adjust a transmission direction of light externally provided into the lower panel 100 and the upper panel 200, respectively, in accordance with an aligned direction of the liquid crystal layer 3.

As shown in FIG. 3, the liquid crystal panel assembly 300 includes a display area DA in which most of the pixels and the display signal lines $D_1$ to $D_m$ and $G_1$ to $G_n$ are disposed, and a peripheral area PA surrounding the display area DA.

An illumination sensor 700 is formed within the peripheral area PA through the same process as forming the pixels and switching elements Q. That is, while the pixels and switching elements Q are formed on the lower panel 100, portions of the illumination sensor 700 are substantially simultaneously formed. The illumination sensor 700 serves to generate an output voltage Vout depending upon types of ambient light and indoor illumination.

The illumination sensor 700 includes a plurality of sensors 701, 702, and 703 as shown in FIG. 4 and the sensors 701, 702, and 703 include red, green, and white filters 730R, 730G, and 730W provided on the upper panel 200 and photo sensors 740R, 740G, and 740W provided on the lower panel 100, respectively. The filters 730R, 730G, and 730W are aligned with the photo sensors 740R, 740G, and 740W. The photo sensors 740R, 740G, and 740W are formed on the lower panel 100 at substantially the same time as the pixels and switching elements Q are formed on the lower panel 100, as will be further described below. Likewise, the filters 730R, 730G, and 730W may be formed on the upper panel 200 at substantially the same time as color filters used in the display area DA are formed on the upper panel 200.

A determination unit 750 outputs a control signal CONT3 for controlling the signal controller 600 on the basis of the output Vout of the illumination sensor 700.

The gray voltage generator 800 generates two pairs of gray voltages associated with the transmittance of the pixels in a unit of red, green, and blue. One of the two pairs has positive values with respect to the common voltage $V_{com}$ and the other has negative values with respect thereto.

The gate driver 400 is connected to the gate lines $G_1$-$G_n$ of the liquid crystal panel assembly 300 and synthesizes the gate-on voltage $V_{on}$ and the gate-off voltage $V_{off}$ from an external device to generate gate signals for application to the gate lines $G_1$-$G_n$. The data driver 500 is connected to the data lines $D_1$-$D_m$ of the liquid crystal panel assembly 300 and applies data voltages selected from the gray voltages supplied from the gray voltage generator 800 to the data lines $D_1$-$D_m$.

The gate driver 400 or data driver 500 may be mounted on the liquid crystal panel assembly 300 in a chip on glass ("COG") manner. Alternatively, the integrated circuits may be mounted on a tape carrier package ("TCP") and the TCP may be attached to the liquid crystal panel assembly 300. Alternatively, a circuit performing the same function as the integrated circuit chip may be formed directly on the liquid crystal panel assembly 300.

The signal controller 600 controls operations of the gate driver 400, the data driver 500, the gray voltage generator 800, and the backlight unit 900.

Now, display operations of the LCD will be further described.

The signal controller 600 is supplied with red, green, and blue input image signals R, G, and B and input control signals for controlling display of the input image signals R, G, and B, such as a vertical synchronization signal $V_{sync}$, a horizontal synchronization signal $H_{sync}$, a main clock signal MCLK, and a data enable signal DE, from an external graphics controller (not shown). The signal controller 600 properly processes the image signals R, G, and B in accordance with operational conditions of the liquid crystal panel assembly 300 on the basis of the input image signals R, G, and B and the input control signals, generates a gate control signal CONT1 and a data control signal CONT2, and then supplies the gate control signal CONT1 to the gate driver 400 and the data control signal CONT2 and the processes image signals DAT to the data driver 500.

In addition, the signal controller 600 supplies a control signal CONT4 for adjusting the gray voltage and a control signal CONT5 for controlling brightness to the gray voltage generator 800 and the backlight unit 900, respectively, in accordance with the control signal CONT3 from the determination unit 750.

The gate control signals CONT1 include a scanning start signal for initiating scanning, such as a vertical synchronizing start signal STV, and a clock signal, such as at least one gate clock signal CPV, for controlling the output time of the gate-on voltage $V_{on}$. The gate control signals CONT1 may further include an output enable signal OE for defining the duration of the gate-on voltage $V_{on}$.

The data control signals CONT2 include a horizontal synchronization start signal STH for informing the data driver 500 of a start of data transmission to pixels, a load signal LOAD for instructing the data driver 500 to apply the data voltages to the data lines $D_1$-$D_m$, and a data clock signal. The data control signal CONT2 may further include an inversion signal, such as a reverse signal RVS, for reversing a polarity of the data voltages (with respect to the common voltage Vcom).

Responsive to the data control signals CONT2 from the signal controller 600, the data driver 500 receives a packet of the image data DAT, the processed image signals, for a group of pixels from the signal controller 600, converts the image data DAT into analog data voltages selected from the gray voltages supplied from the gray voltage generator 800, and applies the data voltages to the data lines D1-Dm.

The gate driver 400 applies the gate-on voltage Von to the gate line $G_1$-$G_n$ in response to the gate control signals CONT1 from the signal controller 600, thereby turning on the switching elements Q connected thereto. The data voltages applied to the data lines D1-Dm are supplied to the corresponding pixels through the activated switching elements Q.

A difference between a data voltage applied to a pixel and the common voltage Vcom is expressed as a charged voltage across the LC capacitor $C_{LC}$, i.e., a pixel voltage. Liquid crystal molecules have orientations depending on a magnitude of the pixel voltage.

By repeating this procedure by a unit of the horizontal period (which is denoted by "1H" and equal to one period of the horizontal synchronization signal Hsync and the data enable signal DE), all gate lines $G_1$-$G_n$ are sequentially supplied with the gate-on voltage $V_{on}$ during a frame, thereby applying the data voltages to all pixels. When a next frame starts after finishing one frame, the inversion control signal, part of the data control signals CONT2, applied to the data driver 500 is controlled such that a polarity of the data voltages is reversed (which is referred to as "frame inversion"). The inversion control signal may also be controlled such that the polarity of the data voltages flowing in a data line in one frame are reversed (for example, line inversion and dot inversion), or such that the polarity of the data voltages in one packet are reversed (for example, column inversion and dot inversion).

An exemplary thin film panel of the exemplary embodiment of the LCD according to the present invention will now be further described with reference to FIGS. 5 to 10.

Figure 5:
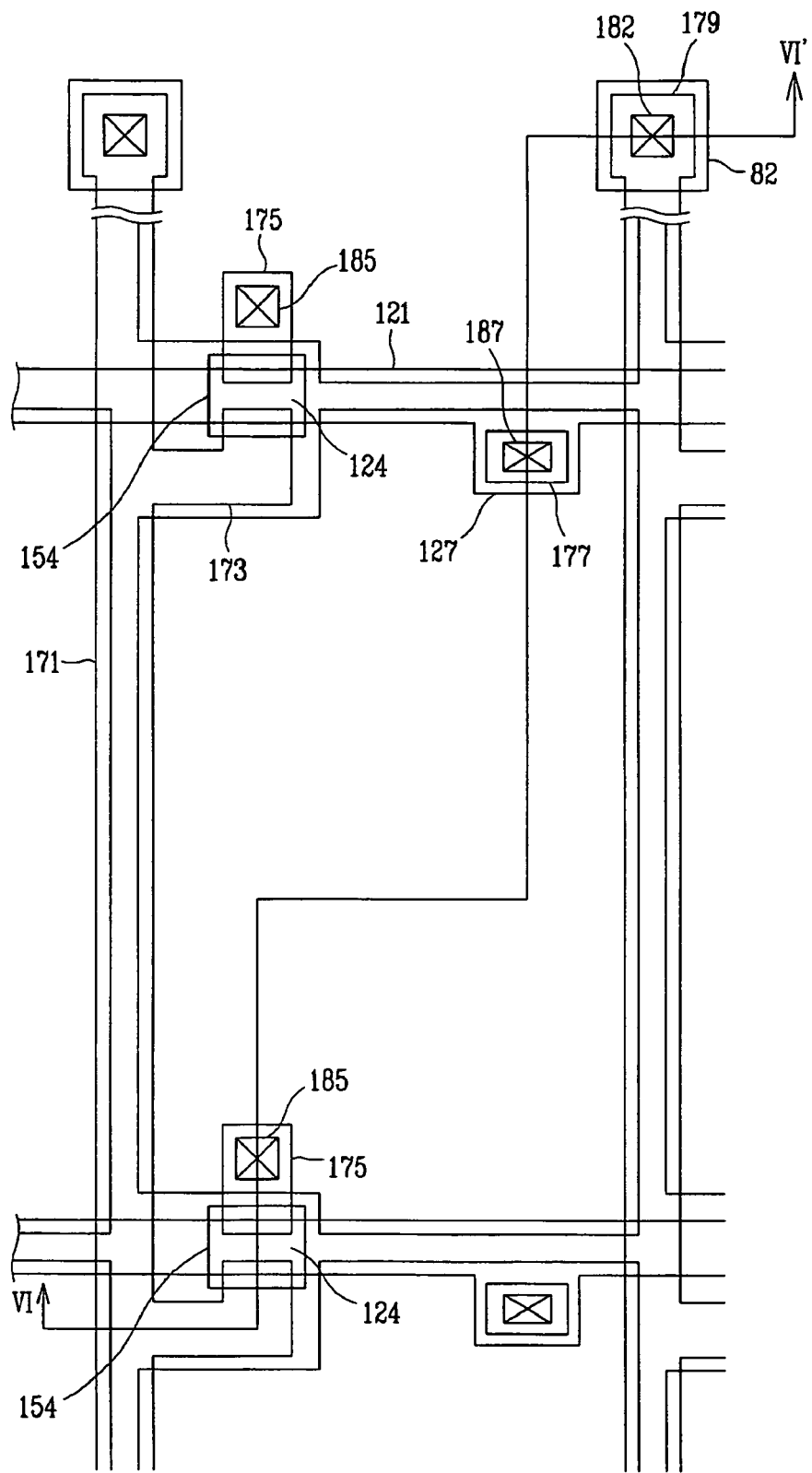
FIG. 5 is a diagram illustrating a layout of an exemplary thin film panel of the exemplary embodiment of the LCD according to the present invention.
Figure 6:
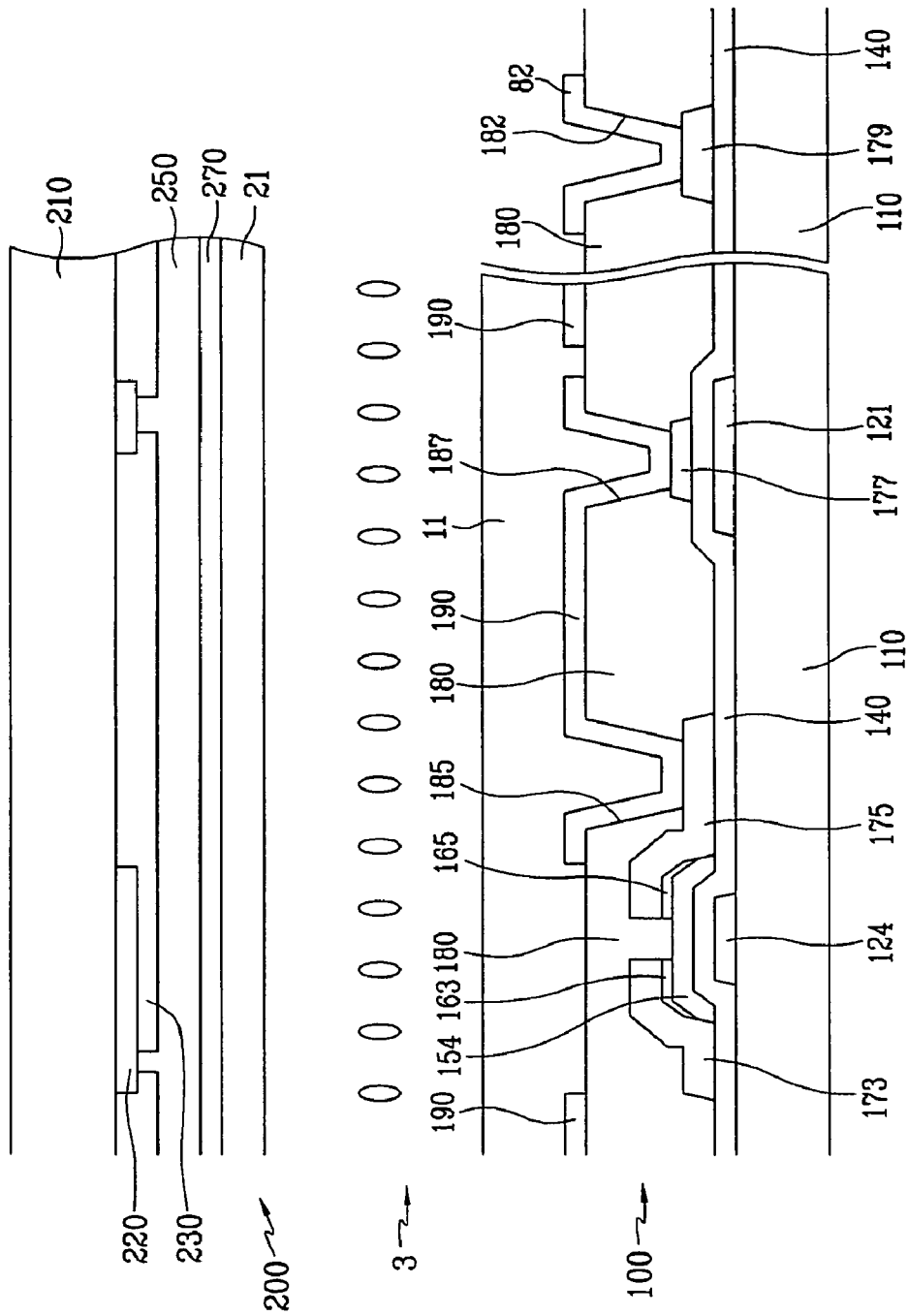
FIG. 6 is a cross-sectional view taken along line VI-VI' of the exemplary embodiment of the LCD including the exemplary thin film panel shown in FIG. 5.
Figure 7:
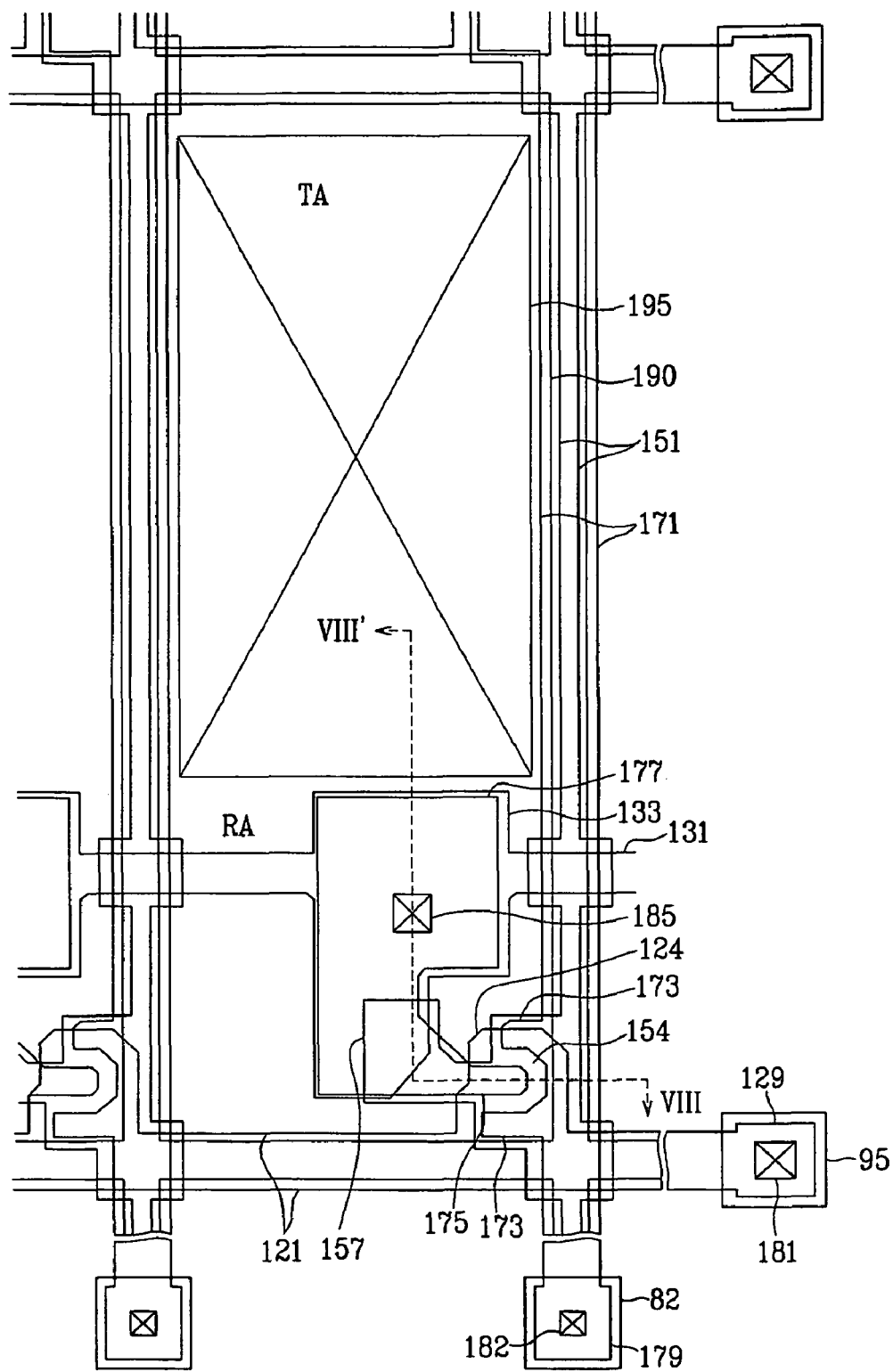
FIG. 7 is a diagram illustrating a layout of an exemplary thin film panel of another exemplary embodiment of an LCD according to the present invention.
Figure 8:
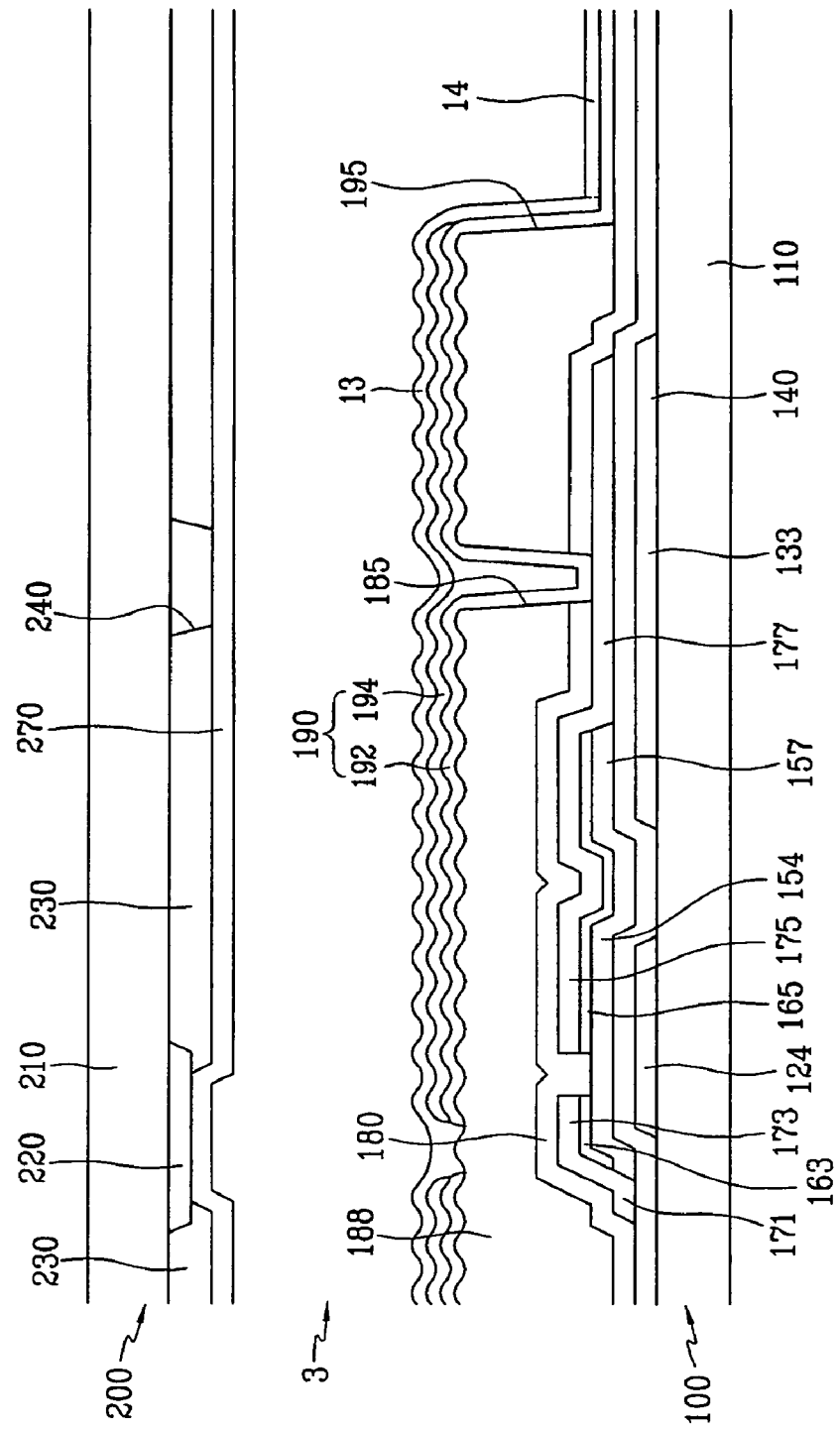
FIG. 8 is a cross-sectional view taken along line VIII-VIII' of the exemplary embodiment of the LCD including the exemplary thin film panel shown in FIG. 7.
Figure 9:
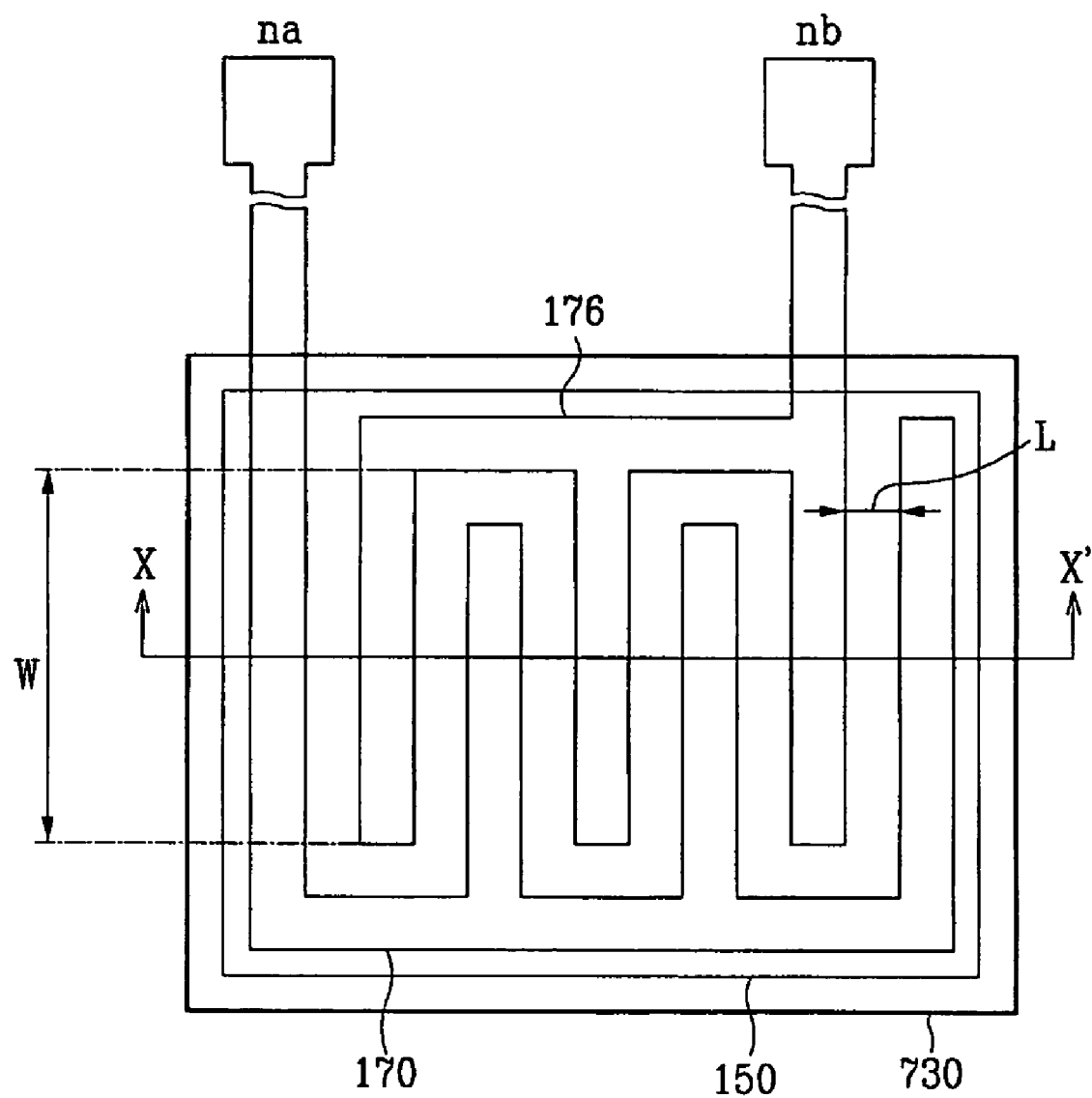
FIG. 9 is a diagram illustrating a layout of the exemplary illumination sensor shown in FIG. 3.
Figure 10:
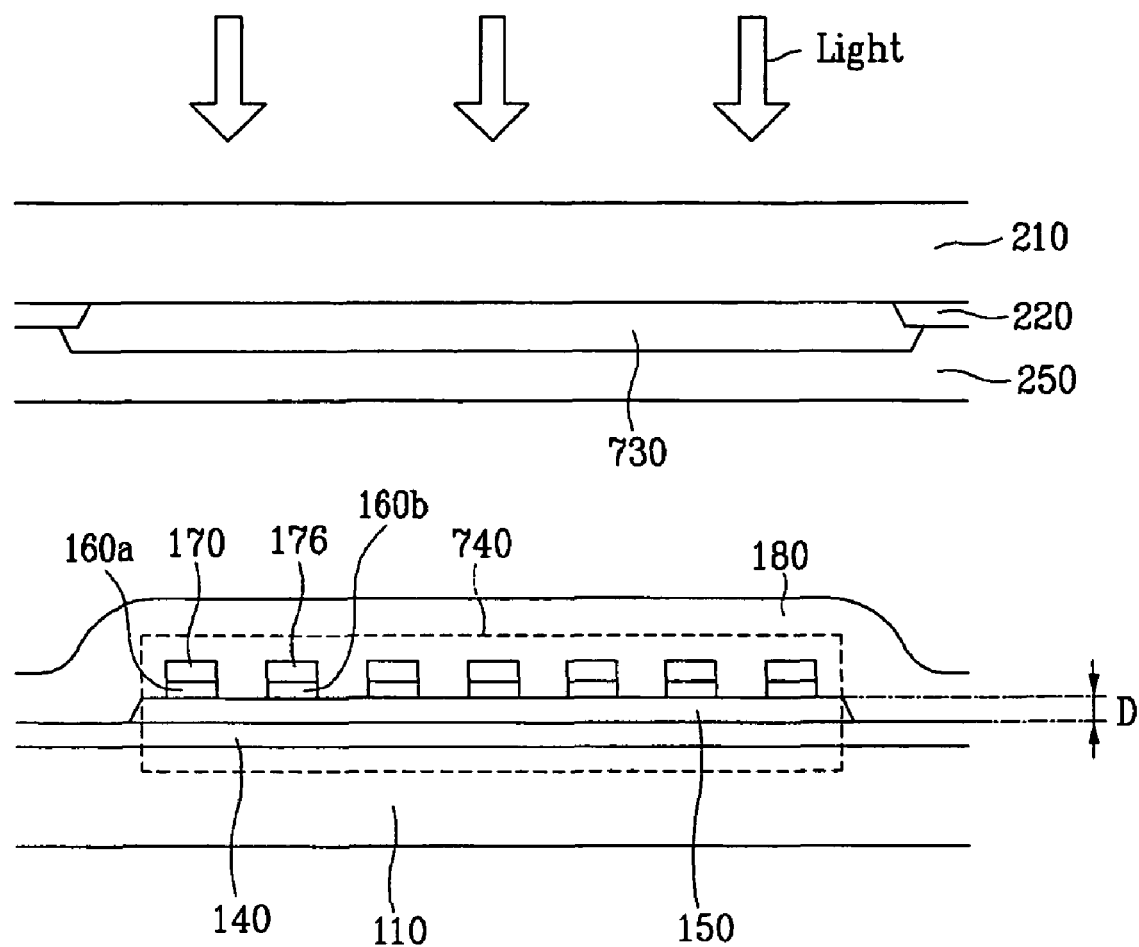
FIG. 10 is a cross-sectional view taken along line X-X' of the exemplary illumination sensor shown in FIG. 9.

FIG. 5 is a diagram illustrating a layout of an exemplary thin film panel of an exemplary embodiment of a transmissive LCD according to the present invention, and FIG. 6 is a cross-sectional view taken along line VI-VI' of the LCD including the exemplary thin film panel shown in FIG. 5. FIG. 7 is a diagram illustrating a layout of an exemplary thin film panel of an exemplary embodiment of a transflective LCD according to the present invention, and FIG. 8 is a cross-sectional view taken along line VIII-VIII' of the LCD including the exemplary thin film panel shown in FIG. 7. FIG. 9 is a diagram illustrating a layout of the exemplary illumination sensor shown in FIG. 3, and FIG. 10 is a cross-sectional view taken along line X-X' of the exemplary illumination sensor shown in FIG. 9.

First, an exemplary embodiment of the LCD according to the present invention will be described with reference to FIGS. 5, 6, 9, and 10.

As shown in FIG. 6, the LCD includes a lower panel 100, an upper panel 200, and a liquid crystal layer 3 filled between the two panels 100 and 200.

First, the upper panel 200, sometimes termed a common electrode panel, will be described.

A light-shielding member 220 is formed on an insulating substrate 210 made of transparent glass or the like, and the light-shielding member 220 has a plurality of apertures which are opposed to pixel electrodes 190 on the lower panel 100 and have substantially the same shape as the pixel electrodes 190. Alternatively, the light-shielding member 220 may include a part corresponding to data lines 171 and a part corresponding to TFTs.

A plurality of color filters 230 and 730, where filters 730 are shown in FIGS. 4 and 9, are formed on the insulating substrate 210, and most of them are positioned in the area surrounded with the light-shielding member 220. The color filters 230 can display one of three colors such as red, green, and blue, primary colors, etc. as described above, and the color filters 730 can display one of red, green, and white. Here, the white filter 730W, as shown in FIG. 4, may be made of a photosensitive agent that is a transparent organic material or may not be formed at all.

An overcoat 250 is formed on the color filters 230 and 730.

A common electrode 270 made of a transparent conductor such as indium tin oxide ("ITO") and indium zinc oxide ("IZO") is formed on the overcoat 250 under which the color filters 230 are positioned, and an alignment layer 21 is formed on the common electrode 270.

Next, the lower panel 100, otherwise termed a TFT panel, will be further described.

Photo sensors 740, as previously shown in FIG. 4, constituting the illumination sensor 700 are formed on the edges of the lower panel 100 in an exemplary embodiment of the LCD according to the present invention.

A plurality of gate lines 121 are formed on the insulating substrate 110.

The gate lines 121 transmit gate signals and extend mainly in the horizontal direction (e.g. transversely), and a part of the gate lines 121 forms a plurality of gate electrodes 124. Another part of the gate lines 121 form a plurality of projections 127 protruded in a direction away from the direction of the gate lines 121.

The gate lines 121 include a conductive layer made of a silver-group metal such as silver (Ag) or a silver alloy, an aluminum-group metal such as aluminum (Al) or an aluminum alloy, or a copper-group metal such as copper (Cu) or a copper alloy, which have low resistivities. The gate lines 121 may have a multi-layer structure including the above-mentioned conductive structure and another conductive layer made of another material such as chromium (Cr), titanium (Ti), tantalum (Ta), molybdenum (Mo), and alloys thereof (for example, a molybdenum-tungsten alloy (MoW)) having excellent physical, chemical, and electrical contact characteristic with ITO or IZO. An example of a combination of the upper layer and the lower layer can include a chromium/aluminum-neodymium (Nd) alloy.

The sidewalls of the gate lines 121 are sloped with respect to the surface of the insulating substrate 110, and the slope angle is in the range of about 30° to about 80°.

A gate insulating layer 140 made of silicon nitride ($SiN_x$) or the like is formed on the gate lines 121.

A plurality of semiconductor islands 154 made of hydrogenated amorphous silicon ("a-Si") or polysilicon are formed on the gate insulating layer 140 over the gate electrodes 124. Likewise, semiconductors 150 are formed in a rectangular shape as part of the photo sensors 740, as shown in FIGS. 9 and 10.

Pairs of island-shaped ohmic contact members 163 and 165 made of silicide or a material such as n+ hydrogenated a-Si that is doped with n-type impurities in a high concentration are formed on the semiconductors 154. Pairs of ohmic contact members 160a and 160b are also formed on a semiconductor 150, as shown in FIG. 10.

The sidewalls of the semiconductors 154 and 150 and the ohmic contact members 163, 165, 160a, and 160b are also sloped with respect to the surface of the insulating substrate 110 and the slope angle is in the range of about 30° to about 80°.

A plurality of data lines 171, a plurality of drain electrodes 175, a plurality of storage-capacitor conductors 177, as shown in FIGS. 5 and 6, and a plurality of input electrodes 170 and output electrodes 176 of the photo sensors 740, as shown in FIGS. 9 and 10, are formed on the ohmic contact members 163, 165, 160a, and 160b and the gate insulating layer 140.

The data lines 171 extend mainly in the vertical direction (e.g. longitudinally), substantially perpendicularly intersect the gate lines 121, and serve to deliver the data voltages. A plurality of branches extending toward the drain electrodes 175 from the data lines 171 constitute source electrodes 173. A pair of a source electrode 173 and a drain electrode 175 are separated from each other and are positioned over sides of the gate electrode 124, respectively.

The input electrodes 170 and the output electrodes 176 are disposed such that a plurality of branches thereof alternate with each other with a constant gap therebetween in a comb tooth shape, as shown in FIG. 9. That is, the input electrode 170 is arranged in a comb tooth shape in one direction, and the output electrode 176 is arranged in a comb tooth shape in an opposite direction, with the comb teeth of the electrodes 170 and 176 alternatingly positioned on the illumination sensor 700. The ends na and nb of the electrodes 170 and 176, constituting the input and output terminals of the illumination sensor 700, are formed to have a larger area than a width the input and output electrodes 170, 176, so as to facilitate contact with an exterior of the illumination sensor 700.

The gate electrodes 124, the source electrodes 173, and the drain electrodes 175 constitute TFTs as the switching elements along with the semiconductors 154. The channels of the TFTs are formed in the semiconductors 154 between the source electrodes 173 and the drain electrodes 175. The input electrodes 170 and the output electrodes 176 constitute the photo sensors 740. Since the output electrodes 176 are arranged to alternate with the input electrodes 170, the channels formed between the input electrodes 170 and the output electrodes 176 have a horseshoe shape.

The storage-capacitor conductors 177 overlap the projections 127 of the gate lines 121.

The data lines 171, the drain electrodes 175, the storage-capacitor conductors 177, the input electrodes 170, and the output electrodes 176 are preferably made of fire-resistant metal such as, but not limited to, chromium (Cr), molybdenum (Mo), alloys thereof, titanium (Ti), and tantalum (Ta), but may have a multi-layered structure including a conductive layer made of a silver-group metal or an aluminum-group metal having low resistivities and another conductive layer made of another material such as chromium (Cr), titanium (Ti), tantalum (Ta), molybdenum (Mo), and alloys thereof (for example, a molybdenum-tungsten alloy (MoW)) having excellent physical, chemical, and electrical contact characteristic with ITO or IZO.

The sidewalls of the data lines 171, the drain electrodes 175, the storage-capacitor conductors 177, the input electrodes 170, and the output electrodes 176 are sloped with respect to the surface of the insulating substrate 110 and the slope angle is in the range of about 30° to about 80°.

The ohmic contact members 163 are sandwiched between the semiconductor islands 154 and the source electrodes 173, the ohmic contact members 165 are sandwiched between the semiconductor islands 154 and the drain electrodes 175, the ohmic contact members 160a are sandwiched between the semiconductor 150 and the input electrodes 170, and the ohmic contact members 160b are sandwiched between the semiconductor 150 and the output electrodes 176. The ohmic contact members 163, 165, 160a, and 160b serve to decrease the ohmic resistance.

A passivation layer 180 is formed on the data lines 171, the drain electrodes 175, the storage-capacitor conductors 177, the input electrodes 170, the output electrodes 176, and the exposed portions of the semiconductors 154 and 150. The passivation layer 180 is made of an organic material having excellent flatness and photosensitivity, an insulating material with a low dielectric constant such as a-Si:C:O and a-Si:O:F formed by the use of a plasma enhanced chemical vapor deposition ("PECVD") method, or silicon nitride which is an inorganic material. Alternatively, the passivation layer 180 may have a double-layered structure including an organic material and silicon nitride.

A plurality of contact holes 185, 187, and 182, as shown in FIGS. 5 and 6, for exposing the drain electrodes 175, the storage-capacitor conductors 177, and end portions 179 of the data lines 171 are formed in the passivation layer 180.

A plurality of pixel electrodes 190 made of ITO or IZO and a plurality of contact assistant members 82 are formed on the passivation layer 180.

The pixel electrodes 190 are physically and electrically connected to the drain electrodes 175 and the storage-capacitor conductors 177 through the contact holes 185 and 187, respectively, are supplied with the data voltages from the drain electrodes 175, and supply the data voltages to the storage-capacitor conductors 177.

As described above, since the pixel electrodes 190 and the common electrode 270 constitute the liquid crystal capacitors $C_{LC}$, the supplied voltages are retained even after the TFTs are turned off. In order to enhance the voltage-retaining ability, the storage capacitors $C_{ST}$ connected to the liquid crystal capacitor $C_{LC}$ in parallel with each other are formed by allowing the pixel electrodes 190 to overlap the neighboring gate lines 121 (referred to as "previous gate lines"). In order to enhance the capacitance, that is, the storage capacitance, of the storage capacitors $C_{ST}$, the overlapping area is increased by enlarging the gate lines 121 to form the projections 127 and the distance between the projections 127 and the pixel electrodes 190 is decreased by providing the storage-capacitor conductors 177, which are connected to the pixel electrodes 190 and overlap the projections 127, under the passivation layer 180.

The pixel electrodes 190 overlap the neighboring gate lines 121 and the neighboring data lines 171, thereby increasing the aperture ratio. However, in an alternative embodiment, the pixel electrodes 190 may not overlap the gate lines 121 and the data lines 171.

The contact assistant members 82 are connected to the end portions 179 of the data lines 171 through the contact holes 182. The contact assistant members 82 serve to reinforce the contact property between the end portions 179 of the data lines 171 and an external device, and protect them. The contact assistant members 82 are not always necessary and are optional.

According to another embodiment of the present invention, transparent conductive polymers are used as the material of the pixel electrodes 190, and opaque reflective metal may be used in the case of a reflective LCD. In this case, the contact assistant members 82 may be made of a material such as ITO or IZO, different from that of the pixel electrodes 190.

An alignment film 11 made of polyimide is formed on the pixel electrodes 190 and the portions of the passivation layer 180 not covered by the pixel electrodes 190.

Another exemplary embodiment of an LCD according to the present invention will now be described with reference to FIGS. 7 and 8.

The LCD includes a TFT panel 100, a common electrode panel 2000 opposed to the TFT panel 100, and a liquid crystal layer 3 disposed between both panels 100 and 200 and having liquid crystal molecules aligned perpendicular or parallel to the surface of both panels 100 and 200.

In the TFT panel 100, as shown in FIGS. 7 and 8, a plurality of gate lines 121 and a plurality of storage electrode lines 131 are formed on an insulating substrate 110 made of transparent glass or the like.

The storage electrode lines 131 extend mainly in the horizontal direction (e.g. transversely), substantially parallel to the gate lines 121, and include a plurality of projections constituting storage electrodes 133. The storage electrode lines 131 are supplied with a predetermined voltage such as a common voltage Vcom that is applied to a common electrode 270 of the common electrode panel 200.

The sidewalls of the gate lines 121 and the storage electrode lines 131 are sloped with respect to the surface of the insulating substrate 110, and the slope angle is in the range of about 20° to about 80°.

A gate insulating layer 140 made of silicon nitride ($SiN_x$) is formed on the gate lines 121 and the storage electrode lines 131.

A plurality of line-shaped semiconductors 151 made of hydrogenated a-Si or polysilicon are formed on the gate insulating layer 140. The line-shaped semiconductors 151 extend mainly in the vertical direction (e.g. longitudinally), substantially parallel to the data lines 171, and a plurality of projections 154 are protruded toward the gate electrodes 124 from the line-shaped semiconductors 151. A plurality of extensions 157 extend from the projections 154. The line-shaped semiconductors 151 have an increased width in the vicinity of the positions where the data lines 171 intersect with the storage electrode lines 131 and the gate lines 121, and the line-shaped semiconductors 151 cover a large area of the gate lines 121 and the storage electrode lines 131 in these vicinities.

A plurality of line-shaped ohmic contact members 161 and island-shaped ohmic contact members 165 made of silicide or a material such as n+ hydrogenated a-Si doped with n-type impurities in a high concentration are formed on the semiconductors 151. The line-shaped ohmic contact members 161 have a plurality of projections 163 and pairs of the projections 163 and the island-shaped ohmic contact members 165 are formed on the projections 154 of the semiconductors 151.

The sidewalls of the semiconductors 151 and the ohmic contact members 161, 163, and 165 are also sloped with respect to the surface of the insulating substrate 110 and the slope angle is in the range of about 30° to about 80°.

A plurality of data lines 171 and a plurality of drain electrodes 175 separated therefrom are formed on the ohmic contact members 161 and 165 and the gate insulating layer 140.

Each drain electrode 175 includes an extension 177 overlapping one storage electrode 133. Each data line 171 includes a plurality of projections, and the projections constitute source electrodes 173 surrounding a part of one end portion of the drain electrode 175. The gate electrode 124, the source electrode 173, and the drain electrode 175 constitute a TFT along with the projection 154 of the semiconductor 151 and the channel of the TFT is formed on the projection 154 between the source electrode 173 and the drain electrode 175.

The sidewalls of the data lines 171 and the drain electrodes 175 are sloped in the range of about 30° to about 80°, similar to the gate lines 121 and the storage electrode lines 131, with respect to the insulating substrate 110.

A passivation layer 180 made of silicon nitride or silicon oxide, which is an inorganic material, is formed on the data lines 171, the drain electrodes 175, and the exposed portions of the semiconductors 151. An organic insulating layer 188 made of an organic material having excellent flatness and photosensitivity is formed on the passivation layer 180. Here, the surface of the organic insulating layer 188 has uneven patterns and maximizes a reflection efficiency of reflection electrodes 194 formed on the organic insulating layer 188 by transferring the uneven pattern to the reflection electrodes 194. The organic insulating layer 188 is removed from pad portions in which the extensions of the gate lines 121 and the data lines 171 are formed, and only the passivation layer 180 remain therein.

Contact holes 182 for exposing the end portions 179 of the data lines 171 are formed in the passivation layer 180, and contact holes 181 for exposing the gate insulating layer 140 and the end portions 129 of the gate lines 121 are also formed in the passivation layer 180. Contact holes 185 for exposing the extensions 177 of the drain electrodes 175 are formed in the passivation layer 180 and the organic insulating layer 188. The contact holes 182, 181, and 185 may have a variety of shapes such as polygonal or circular, and the sidewalls thereof are sloped in the range of about 30° to about 80° or are step-shaped.

A plurality of pixel electrodes 190 are formed on the organic insulating layer 188.

Each pixel electrode 190 includes a transparent electrode 192 formed on the organic insulating layer 188 and a reflection electrode 194 formed on the transparent electrode 192. The transparent electrode 192 may be made of ITO or IZO, which is a transparent conductive material, and the reflection electrode 194 may be made of aluminum (Al), an aluminum alloy, silver (Ag), or a silver alloy, which is opaque and reflective. Each pixel electrode 190 may further include a contact assistant layer (not shown) made of molybdenum (Mo), a molybdenum alloy, chromium (Cr), titanium (Ti), or tantalum (Ta). The contact assistant layer guarantees the contact property between the transparent electrode 192 and the reflection electrode 194, and serves to prevent the transparent electrode 192 from oxidizing the reflection electrode 194.

One pixel can be divided into a transmission area (TA) 195 and a reflection area (RA). The transmission area (TA) 195 is an area where the reflection electrode 194 is removed and the reflection area (RA) is an area where the reflection electrode 194 exists. The organic insulating layer 188 is removed from the transmission area (TA) 195, and the cell gap in the transmission area (TA) 195 is two times the cell gap in the reflection area (RA). Accordingly, it is possible to compensate for the influence of the optical path difference generated while light passes through the liquid crystal layer 3 in the reflection area (RA) and the transmission area (TA).

The pixel electrodes 190 are physically and electrically connected to the extensions 177 of the drain electrodes 175 through the contact holes 185, and are supplied with the data voltages from the drain electrodes 175. The pixel electrodes 190 supplied with the data voltages realign the liquid crystal molecules of the liquid crystal layer 3 by generating an electric field in cooperation with the common electrode 270 on the common electrode panel 200.

Transparent conductive polymers may be used as a material of the pixel electrodes 190, and an opaque reflective metal may be used in the case of a reflective LCD.

A plurality of contact assistant members 95 and 82 connected to the end portions 129 of the gate lines 121 and the end portions 179 of the data lines 171 through the contact holes 181 and 182, respectively, are formed on the passivation layer 180. The contact assistant members 95 and 82 may be formed within the same layer as the transparent electrodes 192 or the reflection electrodes 194.

First and second phase lag layers 13 and 14 for compensating for phase lag of the liquid crystal layer 3 are formed on the reflection electrodes 194 and the exposed transparent electrodes 192, respectively. The first and second phase lag layers 13 and 14 are formed by curing the liquid crystal layer 3 made of liquid crystal molecules.

On the other hand, in the common electrode panel 200 opposed to the TFT panel 100, a light-shielding member 220 referred to as a black matrix is formed on a substrate 210 made of an insulating material such as transparent glass. The light-shielding member 220 serves to prevent the leakage of light between the pixel electrodes 190 and to define opening areas opposed to the pixel electrodes 190.

A plurality of color filters 230 are formed on the insulating substrate 210 and may be partially formed on the light-shielding member 220, and may be partially included in the opening areas defined by the light-shielding member 220.

Since the color filters 230 have a greater thickness in the transmission area (TA) 195 than in the reflection area (RA), it is possible to compensate for a difference in color tone due to a difference in the number of lumens passing through the color filters 230 in the transmission area (TA) 195 and the reflection area (RA). Alternatively, by keeping the thickness of the color filters 230 constant and forming holes, e.g. 240, in the color filters 230 in the reflection area (RA), the difference in color tone can be compensated for.

The common electrode 270 made of a transparent conductive material such as ITO or IZO is formed on the light-shielding member 220 and the color filters 230.

Operations of the illumination sensor 700 having the above-mentioned structure will now be described with reference to FIGS. 9 to 15.

Figure 11:
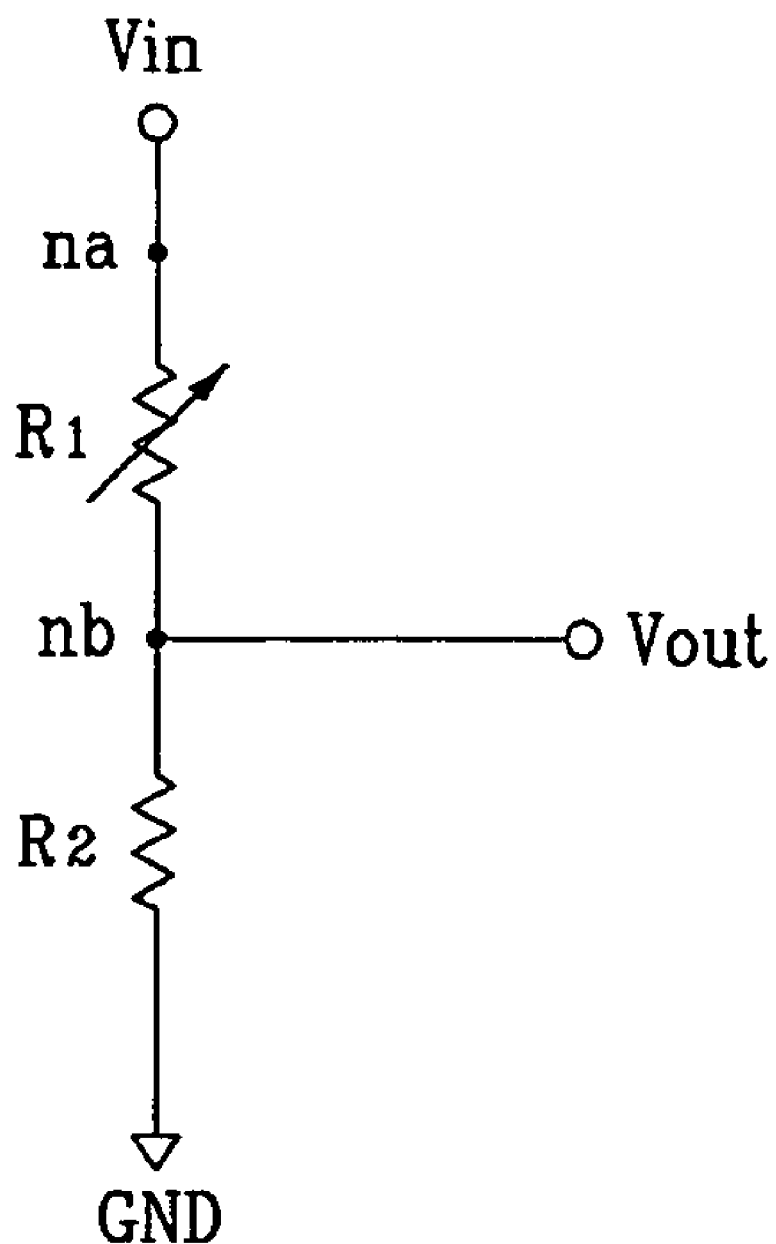
FIG. 11 is an equivalent circuit diagram of the exemplary illumination sensor shown in FIG. 10.
Figure 12:
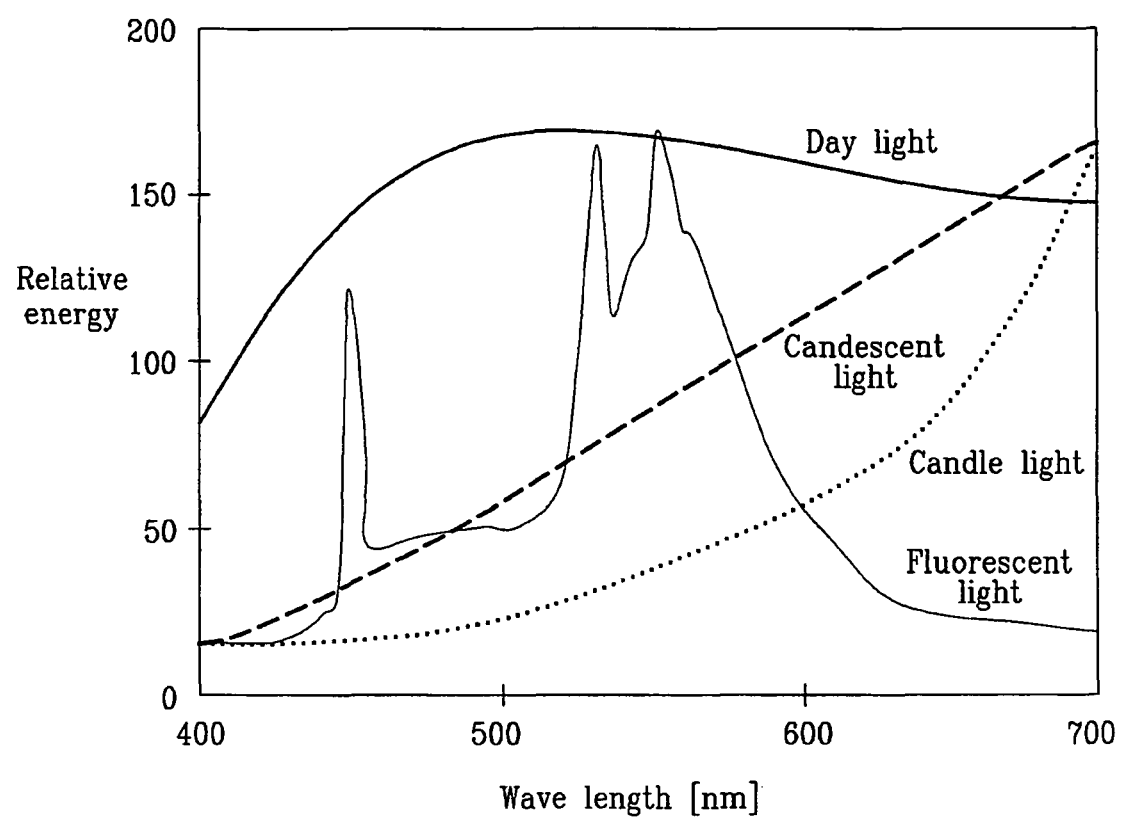
FIG. 12 is a graph obtained by analyzing relative energy of various light sources depending upon wavelengths of light.
Figures 13, 14:
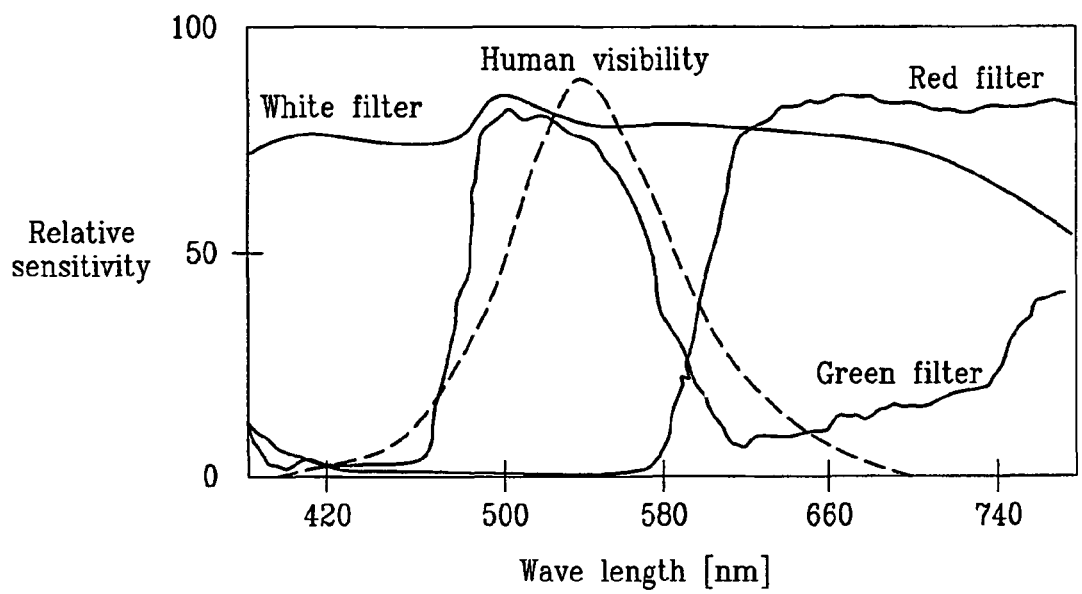
FIG. 13 is a graph obtained by analyzing a sensitivity characteristic of various filters constituting the exemplary illumination sensor shown in FIG. 9 depending upon wavelengths of light.
FIG. 14 is a table in which the sensitivity characteristics of various filters constituting the exemplary illumination sensor shown in FIG. 9 are classified depending upon types of light sources.
Figure 15:
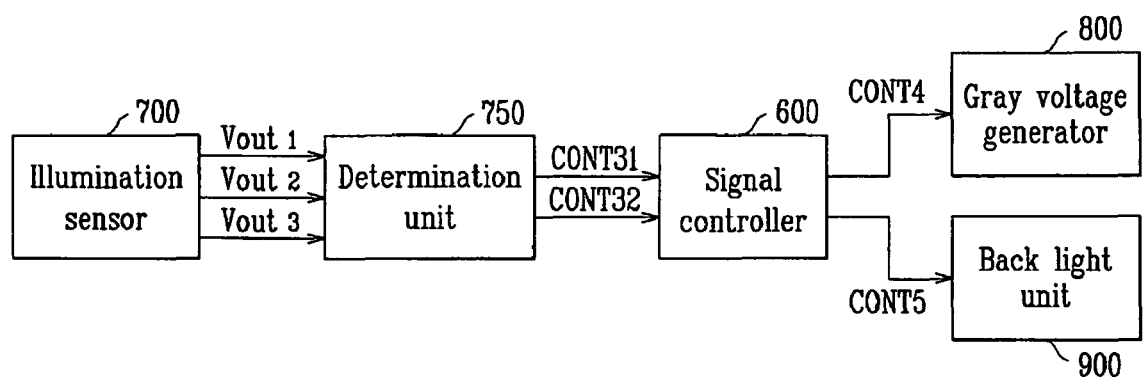
FIG. 15 is a block diagram illustrating an exemplary embodiment of the LCD according to the present invention.

FIG. 11 is an equivalent circuit diagram of the exemplary illumination sensor shown in FIG. 10, and FIG. 12 is a graph obtained by analyzing relative energy of various light sources depending upon wavelengths of light. FIG. 13 is a graph obtained by analyzing sensitivity characteristics of various filters constituting the exemplary illumination sensor shown in FIG. 9 depending upon wavelengths of light, and FIG. 14 is a table in which the sensitivity characteristics of various filters constituting the exemplary illumination sensor shown in FIG. 9 are classified depending upon types of light sources. FIG. 15 is a block diagram illustrating an exemplary embodiment of the LCD according to the present invention.

Referring to FIG. 11, the illumination sensor 700 generates a sensing signal Vout corresponding to the intensity and the type of ambient light.

The sensors 701, 702, and 703, shown in FIGS. 3 and 4, constituting the illumination sensor 700, shown in FIGS. 9 to 11, can be equivalently expressed, as shown in FIG. 11, with a variable resistor R1 and a constant resistor R2 connected in series between an input voltage Vin and a ground terminal GND. The input voltage Vin is applied to one end of the variable resistor R1 through an input terminal na, and an output voltage Vout corresponding to the sensing signal is applied to the other end of the variable resistor R1 through an output terminal nb. The constant resistor R2 may be mounted on a printed circuit board ("PCB") (not shown) connected to the liquid crystal panel assembly 300. One end of the constant resistor R2 is connected to the output terminal nb and the other end thereof is connected to the ground terminal GND.

Here, the photo sensor 740 is composed of a photo resistor of which the resistance varies depending upon the energy of the ambient light. Accordingly, the photo sensor 740 can be expressed with the variable resistor R1 and can be expressed in the equivalent circuit shown in FIG. 11 with the constant resistor R2.

The resistor R1 of the photo sensor 740R, for example, corresponding to the energy $E_p$ of the incident light is determined on the basis of the thickness D of the semiconductors 150 illustrated in FIG. 10 and the width W and the length L between the input and output electrodes 170, 176, as shown in FIG. 9.

$$E_p = \frac{E}{E_\lambda} \qquad \text{Expression 1}$$

Here, $E_p$ denotes relative energy of the incident light, E denotes energy of the incident light, and $E_\lambda$ denotes photo energy of the incident light.

The number n of electrons and holes generated when the light energy $E_p$ defined by Expression 1 is incident through the color filters 730 can be defined by Expression 2. Here, the reflectivity r of light is determined on the basis of physical properties and surface statuses of the insulating substrate 110 and the insulating layer 140, without considering the amount of light energy absorbed by them.

$$n = (1-r)E_p \qquad \text{Expression 2}$$

Conductivity σ of the photo sensor $740R_p$ can be expressed by Expression 3 in consideration of mobilities $\mu_n$ and $\mu_p$ of electrons and holes, structures of the electrodes, namely the width W and the length L between the input and output electrodes 170, 176, and the thickness D of the semiconductors 150. It can be seen from Expression 3 that the conductivity σ is directly proportional to the magnitude of the light energy $E_p$, that is, the relative energy of the incident light.

$$\sigma = \frac{q(\mu_n + \mu_p)(1-r)E_p}{WDL} \qquad \text{Expression 3}$$

The resistance R1 of the photo sensor $740R_p$ can be expressed by Expression 4, which is derived from Expression 3. From Expression 4, variation of the resistance R1 of the photo sensor $740R_p$ with respect to the light energy $E_p$ can be calculated.

$$R1 = \frac{L}{WD\sigma} = \frac{L^2}{q(\mu_n + \mu_p)(1-r)E_p} \qquad \text{Expression 4}$$

The sensitivity of the photo sensor $740R_p$ can be calculated quantitatively by adjusting the width W and the length L of the electrodes 170, 176 of the photo sensor $740R_p$ and the thickness D of the semiconductors 150 by the use of Expression 4. The output voltage Vout can be expressed by Expression 5.

$$V\text{out} = V\text{in} * R2/(R1+R2) \qquad \text{Expression 5}$$

Here, since current generated from the photo sensors 740 increases, that is, the resistance R1 decreases, as the light energy $E_p$ increases, the relative output voltage Vout increases. Therefore, the output voltage Vout is proportional to the light energy $E_p$. Thus, the sensing signal Vout of the illumination sensor 700 is proportional to the light energy $E_p$.

Next, a spectrum characteristic of the exemplary illumination sensor 700 according to the present invention will be described.

FIG. 12 shows a graph obtained by analyzing relative energy of various light sources such as daylight, candescent light, candlelight, and fluorescent light, depending upon wavelengths of light. In the graph, the axis of abscissa (x-axis) denotes wavelength in a visible light range.

When the LCD is for example a television, such light sources typically generate ambient light of the television. Generally, the television is mainly used indoors and the light sources used in homes, offices, or buildings do not depart from the range of fluorescent lights and candescent lights. When the television is positioned by a window or is watched in the daytime, the television can be affected by natural light such as day light.

The daylight exhibits an almost uniform energy distribution in the range of wavelengths greater than 450 nm, and the candescent light exhibits a linearly increasing energy distribution with increase in wavelength. The candlelight exhibits an exponentially increasing energy distribution with increase in wavelength, and the fluorescent light exhibits a relatively high energy distribution in the vicinity of 450 nm and between 500 nm and 600 nm.

On the other hand, FIG. 13 shows relative sensitivity and human visibility with respect to wavelengths of a red filter 730R, a green filter 730G, and a white filter 730W.

The first to third sensors 701, 702, and 703 constituting the illumination sensor 700 have a red filter 730R, a green filter 730G, and a white filter 730W, respectively, and the respective color filters can absorb or transmit energy each in a specific wavelength range. That is, the white filter 730W transmits the energy in the entire wavelength range and exhibits substantially uniform sensitivity in the entire range. The green filter 730G transmits the energy in the wavelength range of 450 nm to 600 nm and the red filter 730R transmits the energy in the wavelength range greater than or equal to 580 nm. Here, a blue filter (not shown) may be used instead of the white filter 730W. Since the sum of red, green, and blue which are the three main colors of light causes white, the sensitivity of white can be obtained by using this fact.

Here, by comparing the graphs shown in FIGS. 12 and 13 with each other, it can be seen that the sensitivity curves of the color filters 730R, 730G, 730W and the light sources having the energy in the range of wavelength of light which passes through the color filters 730R, 730G, 730W are similar to each other. For example, when the light source is fluorescent light, the sensitivity of the green filter 730G is relatively high. When the light source is candescent light, the sensitivity of the red filter 730R is relatively high. When the light source is daylight, the sensitivity of the white filter 730W is relatively high. On the other hand, when the fluorescent light and the daylight are mixed as the light source, the sensitivities of the green filter 730G and the white filter 730W are relatively high. The relative sensitivities of the output voltages Vout are listed in the table shown in FIG. 14.

As the sensitivity of a color filter 730 becomes greater, that is, as the light energy $E_p$ incident to the photo sensor 740 becomes higher, the output voltage Vout becomes higher. Accordingly, as shown in FIG. 14, when the light source is candescent light, the sensitivities of the red filter 730R and the white filter 730W are relatively high and thus the outputs of the first and third sensors 701, 703 including the red filter 730R and the white filter 730W increase. When the light source is fluorescent light, the sensitivities of the green filter 730G and the white filter 730W are relatively high and thus the outputs of the second and third sensors 702, 703 including the green filter 730G and the white filter 730W increase. When the light source is daylight, the sensitivities of all the color filters 730R, 730G, 730W are high and thus the outputs of the first to third sensors 701, 702, 703 increase. A variety of light sources other than the above-mentioned light sources may be further listed in the table. For example, when the light source is candlelight, the sensitivity of the red filter 730R can be set to the middle and the sensitivity of the green filter 730G can be set to be low.

In this way, an exemplary embodiment of the LCD according to the present invention has a spectrum characteristic for identifying the types of the light sources providing light to the liquid crystal panel assembly 300.

Referring to FIG. 15, the first to third sensors 701, 702, and 703 constituting the illumination sensor 700 generate the outputs Vout1, Vout2, and Vout3, respectively, and send the outputs to the determination unit 750.

The determination unit 750 stores data listed in the table shown in FIG. 14 in the form of a lookup table, compares the three outputs Vout1, Vout2, and Vout3 with each other to determine the brightness of the light source, that is, the indoor illumination, in addition to the type of the light source, and outputs a plurality of control signals CONT31 and CONT32 on the basis of the comparison result. The type of the light source can be determined based on the table as described above, and the brightness of the light source can be determined based on the output voltage Vout2.

For example, when the output Vout1 of the first sensor 701 is low and the outputs Vout2 and Vout3 of the second and third sensors 702 and 703 are high, the light source is fluorescent light and the brightness can be obtained by calculating an average or a sum of the two output voltages Vout2 and Vout3. Referring to the graph shown in FIG. 13 described above, since the sensitivity characteristic of the green filter is similar to the human visibility, the indoor brightness or illumination can be preferably measured on the basis of the output voltage Vout2 of the second sensor 702 including the green filter.

At this time, the control signal CONT31 may be associated with the type of light source and the control signal CONT32 may be associated with the indoor brightness or illumination.

The signal controller 600 generates control signals CONT4 and CONT5 on the basis of the two control signals CONT31 and CONT32 and the generated control signals CONT4 and CONT5 are provided to the gray voltage generator 800 and the backlight unit 900.

For example, when the light source is candescent light, the visibility of red is increased. When the light source is fluorescent light, the visibility of green is increased. In this case, since the red screen is seen to be deeper red and the green screen is seen to be deeper green, the color sense is decreased.

Here, the signal controller 600 outputs the control signal CONT4 to the gray voltage generator 800 to lower the gray scale voltage of red or the gray scale voltage of green, thereby providing vivid color sense.

For example, when the indoor brightness or illumination is low, the signal controller 600 outputs the control signal CONT5 to the backlight unit 900 to lower the luminance of the backlight unit 900. Accordingly, since the leakage of light is reduced, the fatigue of human eyes can be mitigated and the power consumption can be reduced. In addition, it is possible to elongate the lifetime of the lamps (not shown) constituting the backlight unit 900 when the luminance of the backlight unit 900 is lowered.

Visual cells of human eyes include rod cells and cone cells, where the rod cells serve to distinguish light and darkness and the cone cells serve to distinguish shape and color. In the indoor place with low illumination, the rod cells sensitively respond to blue with short wavelength and thus recognize the blue screen as deeper blue. On the other hand, the rod cells are insensitive to red and thus do not recognize the red screen well. Accordingly, in this case, by outputting the control signal CONT5 to the backlight unit 900 to lower the luminance thereof and by outputting the control signal CONT4 to the gray voltage generator 800 to lower the gray scale voltage of blue or to enhance the gray scale voltage of red or to simultaneously perform the lowering of the gray scale voltage of blue and the enhancing of the gray scale voltage of red, it is possible to obtain the clear color sense according to human visibility.

Although the photo sensor including three color filters has been described in the above-mentioned embodiments of the present invention, the photo sensor may instead include one or two color filters or four or more color filters. It is also obvious that the LCD according to the present invention can be applied to a reflective LCD in addition to the transmissive and transflective LCDs.

In this way, by integrating the illumination sensor 700 in the liquid crystal panel assembly 300 by the use of the same process as the switching elements of the pixels, it is possible to reduce cost. In addition, it is possible to provide a clearer screen by controlling the gray scale voltage on the basis of the types of the light source, and it is also possible to reduce the power consumption and to elongate the lifetime of the lamp by adjusting the luminance of the backlight on the basis of the indoor illumination.

Although exemplary embodiments of the present invention have been described, the present invention is not limited to the embodiments, but may be modified in various forms without departing from the scope of the appended claims, the detailed description, and the accompanying drawings of the present invention. Therefore, it is natural that such modifications belong to the scope of the present invention.

What is claimed is:

1. A display panel comprising a first panel, a second panel, an illumination sensor and a determination unit,
   wherein the illumination sensor includes:
   a plurality of color filters disposed on a peripheral area of the first panel, the peripheral area of the first panel surrounding a display area of the first panel; and
   a plurality of photo sensors disposed on a peripheral area of the second panel corresponding to the peripheral area of the first panel, at least two photo sensors of the plurality of photo sensors opposing at least two different color filters of the plurality of color filters,
   wherein the plurality of photo sensors generate a plurality of output voltages, respectively,
   at least two of the plurality of output voltages are responsive to intensities of light which pass through the at least two different color filters,
   the determination unit outputs a first control signal based on the plurality of output voltages, and
   the determination unit includes a lookup table in which magnitudes of the plurality of output voltages corresponding to the at least two different color filters are classified based on spectral characteristics of an external light.

2. The display panel of claim 1, wherein the plurality of color filters includes at least two of a red filter, a green filter and a white filter.

3. The display panel of claim 2, wherein resistance of the at least one of the photo sensors varies depending upon light energy which passes through the at least one of the color filters.

4. The display panel of claim 2, wherein the at least one of the photo sensors includes:
   a substrate;
   a first insulating layer formed on the substrate;
   a semiconductor layer formed on the first insulating layer;
   first and second electrodes formed on the semiconductor layer; and
   a second insulating layer formed on the first and second electrodes.

5. The display panel of claim 4, wherein the second panel is a thin film transistor panel including a plurality of gate lines and data lines, the first and second electrodes of each photo sensor formed within a same layer of the second panel as the data lines.

6. The thin film panel of claim 4, wherein the first and second electrodes are interdigitated.

7. The display panel of claim 6, wherein the semiconductor layer includes amorphous silicon.

8. The display panel of claim 7, wherein the illumination sensor is formed on an edge of the thin film panel.

9. The display panel of claim 1, wherein the first panel is a common electrode panel including a common electrode and the second panel is a thin film transistor panel including a plurality of thin film transistors and pixel electrodes.

10. The display panel of claim 1, wherein the plurality of output voltages of the plurality of photo sensors are respectively proportional to energy of an ambient light source incident to the illumination sensor.

11. The display panel of claim 1, wherein the determination unit receives the plurality of output voltages directly from the at least one of the photosensors.

12. A liquid crystal display comprising a thin film panel having first and second panels and an illumination sensor integrated on the thin film panel, a gray voltage generator which generates a plurality of gray voltages in a unit of three colors, a determination unit and a signal controller,
    wherein the illumination sensor includes:
    a plurality of color filters disposed on a peripheral area of the first panel, the peripheral area of the first panel surrounding a display area of the first panel; and
    a plurality of photo sensors disposed on a peripheral area of the second panel corresponding to the peripheral area of the first panel, at least two photo sensors of the plurality of photo sensors opposing at least two different color filters of the plurality of color filters,
    wherein the illumination sensor outputs a plurality of sensing signals respectively based on intensities of light which pass through the at least two different color filters,
    the determination unit compares the plurality of sensing signals with each other and outputs first control signals based on a result of comparing the plurality of sensing signals with each other,
    the signal controller outputs second control signals based on the first control signals, the second control signals comprising a third control signal supplied to the gray voltage generator,
    the third control signal is generated based on the light intensities which pass through the at least two different color filters, and
    the determination unit includes a lookup table in which magnitudes of the plurality of sensing signals corresponding to the at least two different color filters are classified based on spectral characteristics of the external light.

13. The liquid crystal display of claim 12, wherein the plurality of color filters include at least two of a red filter, a green filter and a white filter.

14. The liquid crystal display of claim 12, wherein each of the at least two photo sensors includes:
    a substrate;
    a first insulating layer formed on the substrate;
    a semiconductor layer formed on the first insulating layer;

first and second electrodes formed on the semiconductor layer; and a second insulating layer formed on the first and second electrodes.

15. The liquid crystal display of claim 14, wherein the second panel is a thin film transistor panel including a plurality of gate lines and data lines, the first and second electrodes of each photo sensor formed within a same layer of the second panel as the data lines.

16. The liquid crystal display of claim 14, wherein the first and second electrodes are interdigitated.

17. The liquid crystal display of claim 12, wherein the illumination sensor includes first and second resistors connected in series between an input voltage and a ground voltage.

18. The liquid crystal display of claim 17, wherein the first resistor is a variable resistor of which resistance varies depending upon an external light and the second resistor is a constant resistor with constant resistance.

19. The liquid crystal display of claim 18, further comprising an output terminal connected to a node between the variable resistor and the constant resistor, the output terminal outputting the sensing signals.

20. The liquid crystal display of claim 19, wherein the plurality of sensing signals are respectively proportional to energy of the external light.

21. The liquid crystal display of claim 20, further comprising:

pixels; and a backlight unit which supplies internal light to the thin film panel, wherein the pixels include pixels of three colors.

22. The liquid crystal display of claim 21, wherein the second control signals further comprise a fourth control signal supplied to the backlight unit.

23. The liquid crystal display of claim 22, wherein the fourth control signal is generated based on brightness of the external light.

24. The liquid crystal display of claim 23, wherein the illumination sensor outputs the plurality of sensing signals corresponding to energy of light passing through the at least two different color filters formed on the first panel.

25. The liquid crystal display of claim 24, wherein the plurality of color filters are selected from a red filter, a green filter, a blue filter, and a white filter.

26. The liquid crystal display of claim 25, wherein the illumination sensor includes first to third sensors, and wherein the first to third sensors include the red filter, the green filter, and the white filter, respectively.

27. The liquid crystal display of claim 26, wherein the determination unit outputs the first control signal for controlling the backlight unit based on the sensing signal output from the second sensor.

28. The liquid crystal display of claim 12, wherein the liquid crystal display is any one of a transmissive type, a reflective type, and a transflective type.

29. The liquid crystal display of claim 12, wherein the determination unit receives the plurality of sensing signals directly from the illumination sensor.

* * * * *